United States Patent
Blodgett, Jr.

(10) Patent No.: US 6,702,353 B1
(45) Date of Patent: Mar. 9, 2004

(54) REMOTELY ACTUATED BRAKE FOR SLIDE-OUT MECHANISM

(75) Inventor: Raymond Willis Blodgett, Jr., Norco, CA (US)

(73) Assignee: RBW Industries, Inc., Chino, CA (US)

( * ) Notice: Subject to any disclaimer, the term of this patent is extended or adjusted under 35 U.S.C. 154(b) by 0 days.

(21) Appl. No.: 09/723,020

(22) Filed: Nov. 27, 2000

(51) Int. Cl.[7] .................................................. B60P 3/34
(52) U.S. Cl. .................................. 296/26.01; 296/26.13
(58) Field of Search .......................... 296/26.03, 26.08, 296/26.09, 26.12, 26.13, 26.01; 188/171; 192/226

(56) References Cited

U.S. PATENT DOCUMENTS

| | | | |
|---|---|---|---|
| 1,521,635 A | | 1/1925 | Lewis |
| 2,842,972 A | | 7/1958 | Houdart |
| 3,137,041 A | | 6/1964 | Mullen |
| 4,133,571 A | | 1/1979 | Fillios |
| 4,253,283 A | | 3/1981 | May |
| 4,273,225 A | * | 6/1981 | Swanson |
| 4,480,866 A | | 11/1984 | Komatsu |
| 4,500,132 A | | 2/1985 | Yoder |
| 4,945,780 A | * | 8/1990 | Bosma |
| 4,955,661 A | | 9/1990 | Mattice |
| 5,092,650 A | | 3/1992 | Perlot |
| 5,121,018 A | * | 6/1992 | Oldakowski ................. 310/77 |
| 5,127,697 A | | 7/1992 | St. Marie |
| 5,154,469 A | | 10/1992 | Morrow |
| 5,237,782 A | | 8/1993 | Cooper |
| 5,332,276 A | | 7/1994 | Blodgett, Jr. |
| 5,333,420 A | | 8/1994 | Eden |
| 5,491,933 A | | 2/1996 | Miller et al. |
| 5,577,578 A | * | 11/1996 | Lazorchak ................. 188/171 |
| 5,620,077 A | * | 4/1997 | Richard ..................... 188/173 |
| 5,758,918 A | | 6/1998 | Schneider et al. |
| 5,833,296 A | | 11/1998 | Schneider |
| 5,853,215 A | * | 12/1998 | Lowery ..................... 296/24.1 |
| 6,266,931 B1 | * | 7/2001 | Erickson et al. ..... 296/26.13 X |

* cited by examiner

*Primary Examiner*—Dennis H. Pedder
(74) *Attorney, Agent, or Firm*—Inskeep Intellectual Property Group, Inc.

(57) ABSTRACT

The present invention relates to a vehicle having a fixed room and a slide-out room which extends and retracts relative to the fixed room. The fixed room includes a floor section, sidewall sections, and a roof section, and the slide-out room includes a floor section, sidewall sections, and a roof section. A slide-out extension mechanism extends and retracts the slide-out room in a cantilevered manner. In a fully retracted position, the roof section and two of the sidewall sections of the slide-out room are typically concealed from exterior view, and a third sidewall section of the slide-out room forms a portion of the sidewall section of the fixed room. Furthermore, the floor section of the slide-out room is flush with the floor section of the fixed room, and proximal ends of the sidewall sections of the slide-out room are flush with an inner surface of one of the sidewall sections of the fixed room when the slide-out room is fully extended. The slide-out extension mechanism includes a first elongated member which is secured to the fixed room and a second elongated member which is slidingly coupled to the first elongated member. The second elongated member is secured to the slide-out room such that extension and retraction of the second elongated member causes the slide-out room to similarly extend and retract. In order to preferentially strengthen the second elongated tube in the z direction, the second elongated tube includes a first tube fastened to a second tube. An electric motor and brake are coupled to the second elongated member and operate in combination to selectively retract, extend and lock the second elongated member. The slide-out room in the event the motor is inoperable. The manual override system includes a remote brake release system to remotely release the brake.

6 Claims, 30 Drawing Sheets

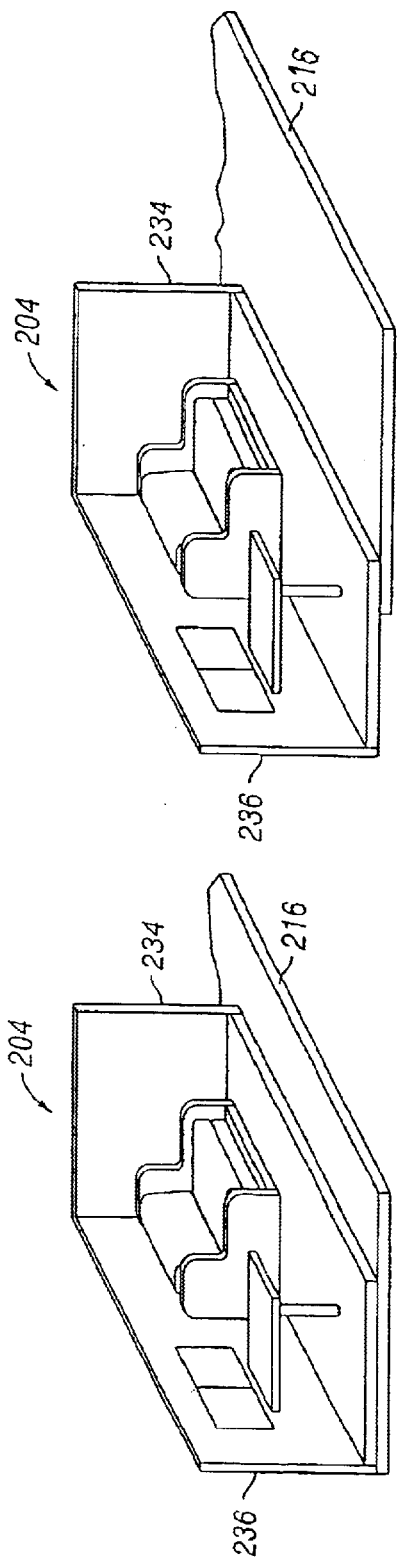
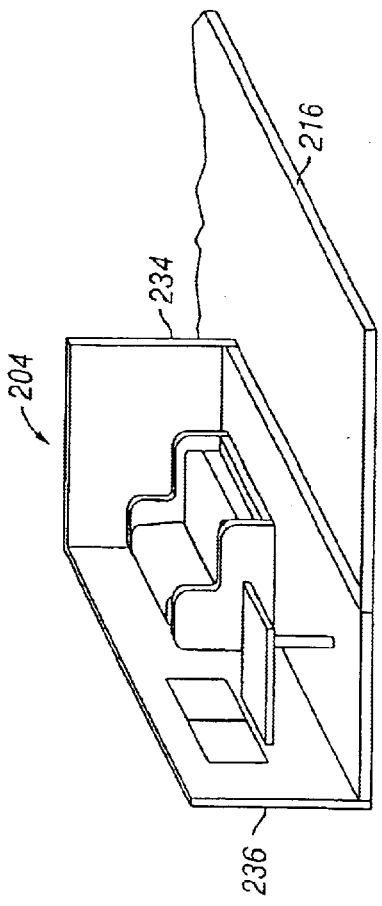
FIG. 6A
FIG. 6B
FIG. 6C

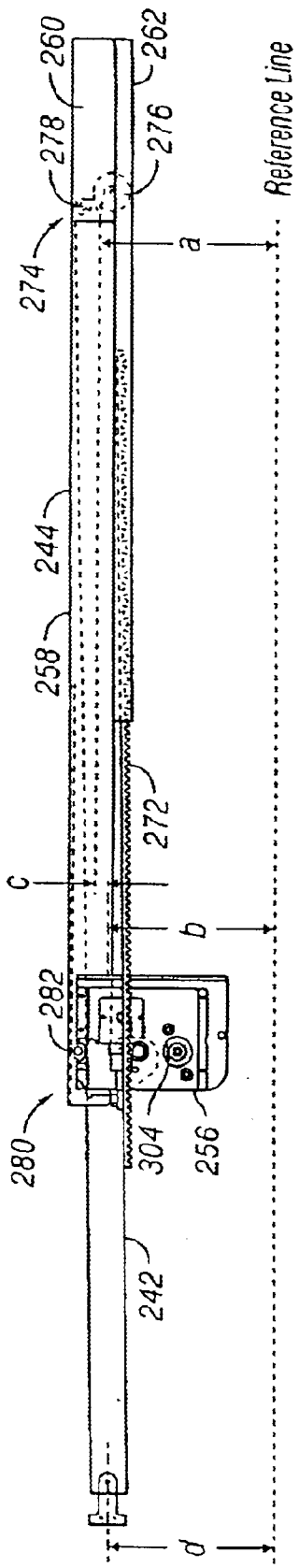
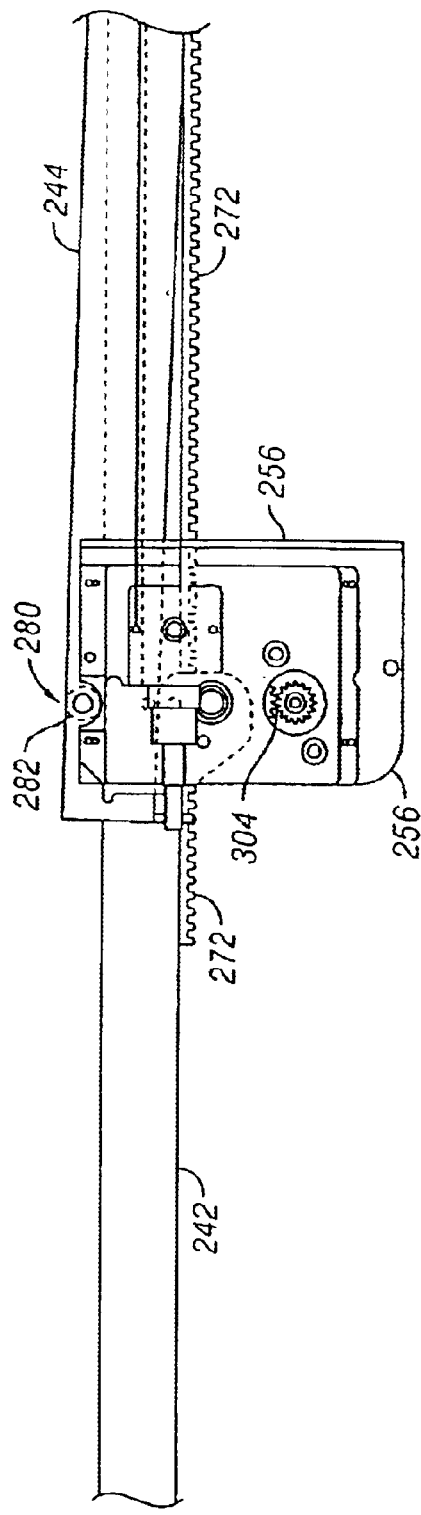
FIG. 8
FIG. 9

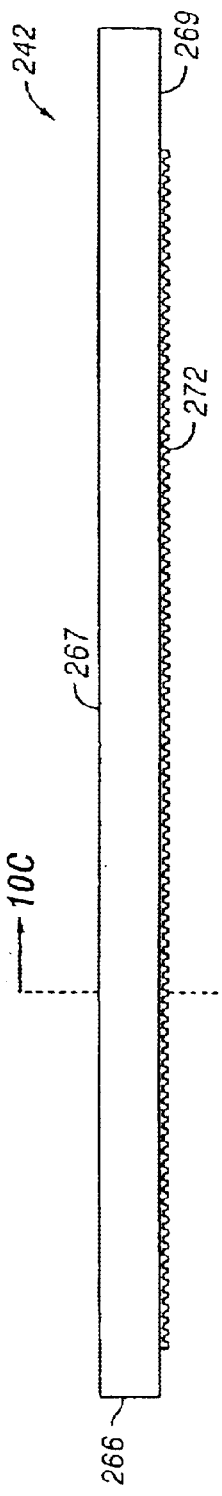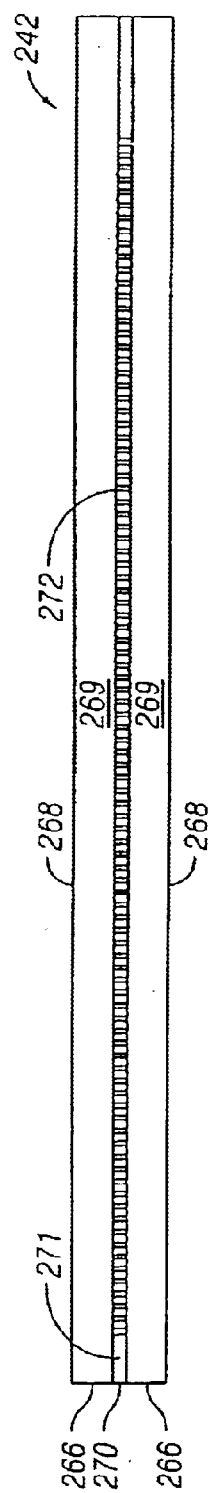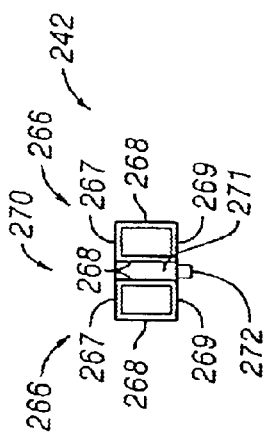
FIG. 10A
FIG. 10B
FIG. 10C

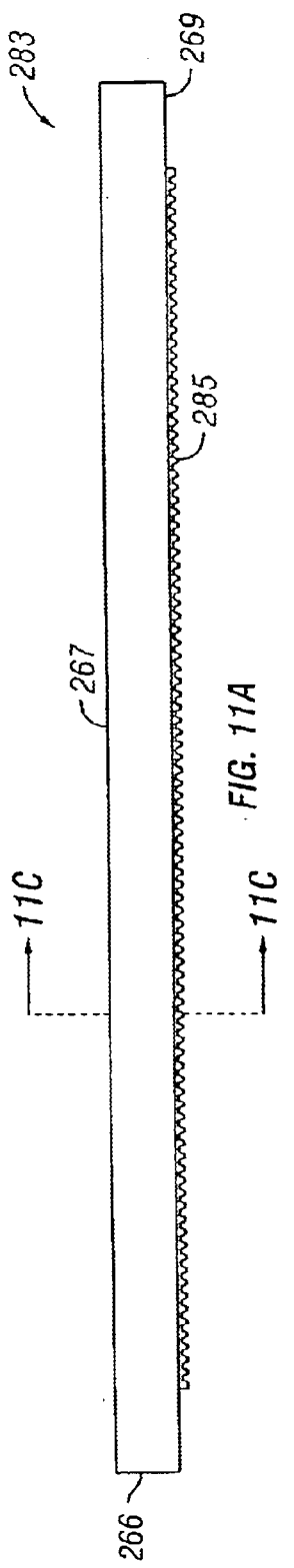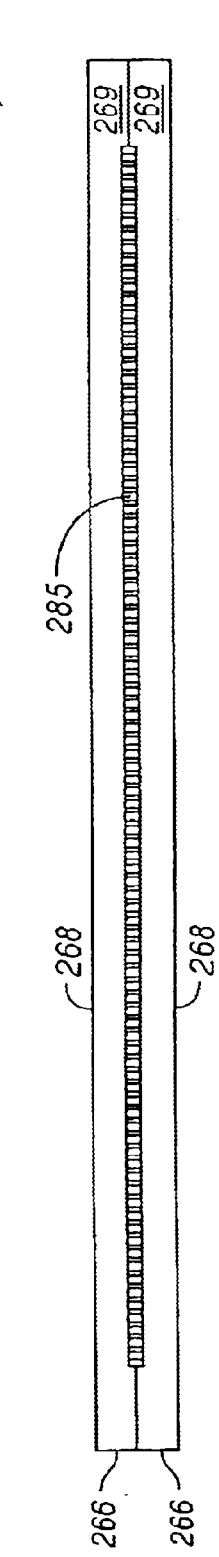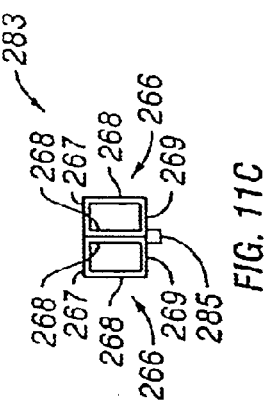

US 6,702,353 B1

REMOTELY ACTUATED BRAKE FOR SLIDE-OUT MECHANISM

FIELD OF THE INVENTION

The present invention relates generally to the field of expandable vehicles, and more particularly to an operating mechanism for selectively extending and retracting a slide-out room of a motorized or towable vehicle. The operating mechanism includes a remotely actuated brake.

BACKGROUND OF THE INVENTION

In order to increase the available interior space of a motorized or towable vehicle such as a motor home or trailer, slide-out rooms can be made integral with the vehicle. When the vehicle is in transit, the slide-out room can be retracted and stored in the vehicle's interior with the exterior wall of the slide-out room approximately flush with the vehicle's exterior. As such, there is typically adequate space within the vehicle's interior to accommodate users in transit and remain within the standard width limitations imposed upon a vehicle. When the vehicle is parked and leveled, the slide-out room is then slid outward through an opening formed in a sidewall of a fixed room, increasing the internal accommodations.

As shown in FIGS. 1A and 1B, a typical slide-out room 20 usually includes a floor section 22, a roof section 24, a first sidewall section 26, a second sidewall section 28, and a third sidewall section 30. In the retracted position, the roof section 24 and the first 26 and second sidewall section 28 are concealed from exterior view, and the third sidewall section 30 forms a portion of the vehicle's sidewall. At the same time, the floor section 22 of the slide-out room 20 typically rests above a floor section 32 of a fixed room 34 and may form a portion of the usable interior floor during vehicle transit. Similarly, the roof section 24 of the slide-out room 20 may define the interior ceiling of that part of the vehicle during transit. The proximal ends of the roof section 24, first sidewall section 26, and second sidewall section 28, include stop walls 36. As used herein, "proximal" refers to the portion towards the vehicle body and "distal" refers to the portion away from the vehicle body. The stop walls 36 form a L-shaped configuration with the respective roof section 24, first sidewall section 26, and second sidewall section 28. The stop walls 36 engage the inner surface 38 of a respective sidewall section 40 of the fixed room 34 when the slide-out room 20 is fully extended, and thereby limit the travel of the slide-out room 20. Weather sealing material 42, as in compressible strip form, is located on the abutting surfaces of the stop walls 36 and/or inner surface 38 of the respective sidewall 40 of the fixed room 34.

A number of slide-out extension mechanisms are currently used to extend and retract the slide-out room. Typically, a slide-out extension mechanism 44 includes a pair of support rails 46 which telescopically extend and retract from a pair of channels 48. The support rails 46 are attached to the slide-out room 20 and the channels 48 are attached to the fixed portion of the vehicle, such as the fixed room 34, wherein the slide-out room 20 retracts and extends with the retraction and extension of the support rails 46. The support rails 46 may be driven hydraulically, pneumatically, electrically or various combinations thereof. In the fully extended position, the support rails 46 extend outwardly in a cantilevered manner and support the slide-out room 20. The slide-out room 20 is further supported by the stop walls 36 abutting the inner surface 38 of the respective sidewall section 40 of the fixed room 34.

Since the slide-out room 20 is nested within a portion of the fixed room 34, it is usually dimensioned smaller than the fixed room 34. Thus, when the slide-out room 20 is in an extended position, the floor section 22 of the slide-out room 20 is higher than the floor section 32 of the fixed room 34. Such stepped flooring 50 has frequently been found to be undesirable, inconvenient, and somewhat hazardous. For example, a person may easily overlook the step and trip or stumble if care is not taken. Furthermore, the step limits the positioning of furniture within the room, and the step makes it difficult to create an aesthetically pleasing floor appearance.

In response, slide-out rooms 100 have been developed with flooring having a flush upper surface (see FIGS. 2A and 2B). Unfortunately, a slide-out mechanism 102 can be overly complicated, expensive, and relatively heavy. In the vehicular environment, unnecessary weight reduces fuel economy and may lead to an overly cumbersome vehicle. However, if the slide-out extension mechanism 102 is insufficiently rigid, flexing may lead to misalignment of the drive mechanism such that the support rails 104 are no longer extended/retracted in synchronism. As a result, the slide-out extension mechanism 102 may become skewed or bind during the transit sliding action. Another problem arising from an insufficiently rigid structure is that the slide-out room 100 may exhibit "bouncing" when a dynamic load is imposed on a floor section 106. This can be particularly annoying when an occupant causes the slide-out room 100 to bounce while walking. In severe cases, cantilevering forces acting on the slide-out mechanism 102 may cause the sidewall sections 108, 110, 112 of the slide-out room 100 to sag and the floor section 106 to separate at their abutting edges. Furthermore, slide-out rooms using multiple floor panels, either completely removable or foldable on hinges, may buckle, warp, split, and crack and permit air drafts to rise from the floor through the gaps created by the misaligned panels.

Referring to FIGS. 3A and 3B, another feature which is growing in popularity is the application of a flush wall system. In the flush wall system, proximal ends of a first sidewall section 150, second sidewall section 152 and roof section 154 of the slide-out room 156 are flush with an interior surface 158 of a respective sidewall section 160 of a fixed room 162 when the slide-out room 156 is fully extended. Weather sealing material 164 is placed along the edge of an opening 166 formed in the sidewall section 160 of the fixed room 162 to form a seal between the rooms 156, 162. By doing away with the stop walls 36, the interior aesthetics is greatly improved. However, the load which was once supported by the stop walls 36 is now redirected to a slide-out extension mechanism 168. As shown in FIG. 3A, cantilevered support rails 170 flex from the added load, and as a result, the slide-out room 156 extends outwardly at a downward incline relative to the fixed room 162. In addition to the awkward appearance of the floor section 172 of the slide-out room 156 being inclined relative to a floor section 174 of the fixed room 162, the proximal end of the floor section 172 of the slide-out room 156 protrudes upwardly and a gap g is formed in the flooring. Furthermore, the seal between the rooms 156, 162 is ineffective because a gap is formed between the rooms 156, 162 due to the misalignment of the sidewall sections 150, 152 and roof section 154 of the slide-out room 156. Since vehicles of this type are often used during inclement weather, water, snow, and cold/hot air drafts may leak into the interior of the vehicle and create an inhospitable environment. In addition, certain vehicles such as medical and dental trailers require sterile environments.

In order to further increase the available interior space of vehicles, there is a growing trend to provide increasingly larger slide-out rooms. To accommodate larger sized slide-out rooms, the cantilevered support rails are lengthened. As a result of lengthening the cantilevered support rails and the increased weight of the slide-out room, the slide-out extension mechanism is more prone to flexing. In addition to the weight of the larger sized slide-out room, existing slide-out mechanism must support the additional weight resulting from furnishing the vehicle with amenities more commonly found in houses such as a microwave oven, refrigerator, dishwasher, washer/dryer, entertainment centers, desktop computer and related accessories. Furthermore, the slide-out extension mechanism must support larger sized furniture such a full size dining table, book shelves, cabinets and the like.

Another feature which is commonly available, particularly when relatively large slide-out rooms are utilized, is an automatically driven slide-out extension mechanism. The slide-out extension mechanism usually includes a motive device such as an electric motor to extend and retract the slide-out room. After the slide-out room is extended or retracted to the desired position, a brake is provided to positively fix the position of the slide-out room. In the event that the electric motor is inoperable, a manual override system is provided to retract or extend the slide-out room. The manual override system usually includes a crank handle which can be manually rotated to extend and retract the slide-out room. Before manually rotating the crank handle, it is usually necessary for an operator to release the brake. The brake is usually located underneath the vehicle in a relatively inaccessible location. Thus, an operator is required to go underneath the vehicle to remove the brake from the slide-out extension mechanism. Some slide-out extension mechanism are provided with a brake release lever pivotally mounted on an end of the brake. However, an operator must still go underneath the vehicle to rotate the brake release lever to the release position.

Thus, there remains a need for an improved slide-out extension mechanism which is capable of extending and retracting a slide-out room in a reliable, easily operated, and quiet manner that can be either incorporated into a vehicle body during manufacturing or retrofitted onto existing vehicle bodies. Furthermore, there remains a need to provide a slide-out extension mechanism which is relatively inexpensive and lightweight and yet sufficiently rigid.

SUMMARY OF THE INVENTION

In accordance with the present invention, a vehicle is provided with a slide-out extension mechanism capable of extending and retracting a slide-out room in a reliable, easily operated, and quiet manner that can be either incorporated into a vehicle body during manufacturing or retrofitted onto existing vehicle bodies. Furthermore, the slide-out extension mechanism is relatively inexpensive and lightweight and yet sufficiently rigid to support large sized slide-out rooms having flush flooring and flush sidewalls.

In an exemplary embodiment, the vehicle includes a fixed room and a slide-out room which extends and retracts relative to the fixed room. The fixed room includes a floor section, sidewall sections, and a roof section, and the slide-out room includes a floor section, sidewall sections, and a roof section. A slide-out extension mechanism extends and retracts the slide-out room in a cantilevered manner. In a fully retracted position, the roof section and two of the sidewall sections of the slide-out room are typically concealed from exterior view and a third sidewall section of the slide-out room forms a portion of the sidewall section of the fixed portion of the vehicle. Furthermore, the floor section of the slide-out room is flush with the floor section of the fixed room, and proximal ends of the sidewall sections of the slide-out room are flush with an inner surface of one of the sidewall sections of the fixed room. The slide-out extension mechanism includes a channel which is secured to the fixed room and a support rail is slidingly coupled to the channel.

An electric motor and brake are coupled to the support rail and operate in combination to selectively move and lock the support rail. The brake is in a lock mode when de-energized and in a release mode when energized. The support rail is secured to the slide-out room such that extension and retraction of the support rail causes the slide-out room to similarly extend and retract. When the slide-out room is extended or retracted to the desired position, the electric motor and brake are both de-energized and the slide-out room is positively fixed.

The slide-out extension mechanism may further include a manual override system to extend, retract, and lock the slide-out room in the event the electric motor is inoperable. The manual override system includes a remote brake release system coupled to the brake and further includes a crank handle which can be manually rotated to extend and retract the slide-out room. Before manual rotation of the crank handle can be accomplished, the brake release system is activated to release the brake.

One of the problems encountered with large sized slide-out rooms with flush floor sections and sidewall sections is that large loads may cause undesired flexing of the slide-out extension mechanism. Excessive complexity, expense, and weight is reduced by preferentially increasing the rigidity of the slide-out mechanism where needed. It has been determined that existing slide-out extension mechanisms are usually sufficiently rigid in the x-y direction but require additional rigidity in the z direction. For support rails having a rectangular-shaped cross section, bending rigidity in the z direction is primarily dependent upon the thickness of the vertically oriented walls, while bending rigidity in the z-y directions is primarily dependent upon the thickness of the horizontally oriented walls. In the present invention, the combined thickness of the vertically oriented walls is increased by providing support rails including a first tube attached to a second tube, wherein the thickness of the horizontally oriented walls is not increased. With the twin tube configuration, standardized tubes having a uniform wall thickness may be utilized instead of a single tube configuration which requires a costly, custom fabricated tube with differing horizontal and vertical wall thicknesses. The combined thickness of the vertically oriented walls is further increased by providing a gear rack with a wall portion disposed between the first tube and the second tube.

In another embodiment of the present invention, a vehicle is provided with a slide-out room having a storage compartment. A distal portion of the support rail is provided with a pivot member, and a longitudinal axis of the pivot remains in a substantially horizontal position during the extension and retraction of the slide-out room. The storage compartment is attached to the pivot member and extends and retracts in unison with the extension and retraction of the slide-out room. Furthermore, the storage compartment remains in a substantial horizontal position during the extension and retraction process.

Other objects, features, and advantages of the present invention will become apparent from a consideration of the following detailed description. The drawings constitute a part of this specification and include exemplary embodiments to the invention which may be embodied in various forms. It is to be understood that in some instances various aspects of the invention may be shown exaggerated or enlarged to facilitate and understanding of the invention.

BRIEF DESCRIPTION OF THE DRAWINGS

FIGS. 6A–6C are perspective interior views of the slide-out room shown in FIG. 5;

FIG. 8 is a plan side view of a portion of the slide-out extension mechanism shown in FIG. 7;

FIG. 9 is an enlarged view of a drive mechanism shown in FIGS. 7 and 8;

FIG. 10A is a plan side view of a support rail for the slide-out extension mechanism, FIG. 10B is a plan bottom view of the support rail shown in FIG. 10A, and FIG. 10C is a cross sectional view of the support rail along line 10C—10C of FIG. 10A;

FIG. 11A is a plan side view of an alternative embodiment of a support rail for the slide-out extension mechanism in accordance with the present invention, FIG. 11B is a plan bottom view of the support rail shown in FIG. 11A, and FIG. 11C is a cross sectional view of the support rail along line 11C—11C of FIG. 11A;

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative for teaching one skilled in the art to employ the present invention in virtually any appropriately detailed system, structure or manner.

Figure 1A:
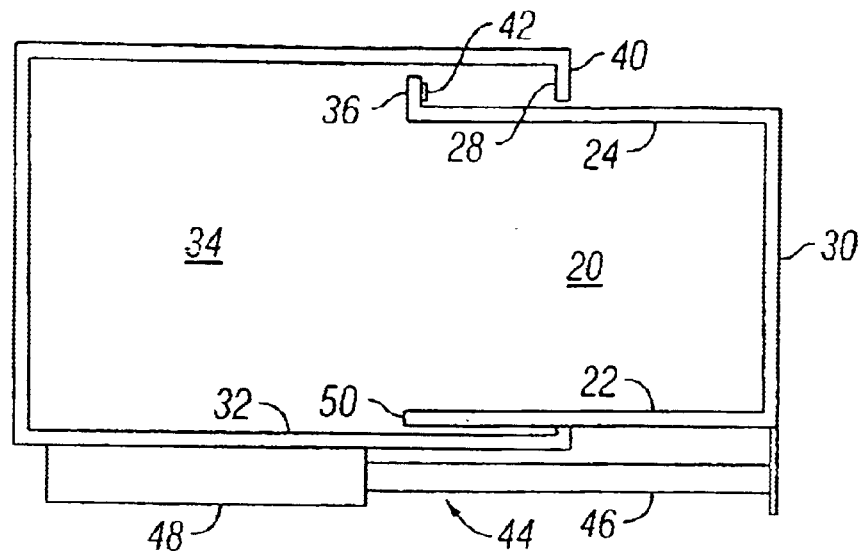
FIG. 1A is a plan side view of a prior art trailer with a slide-out room having stepped flooring.
Figure 1B:
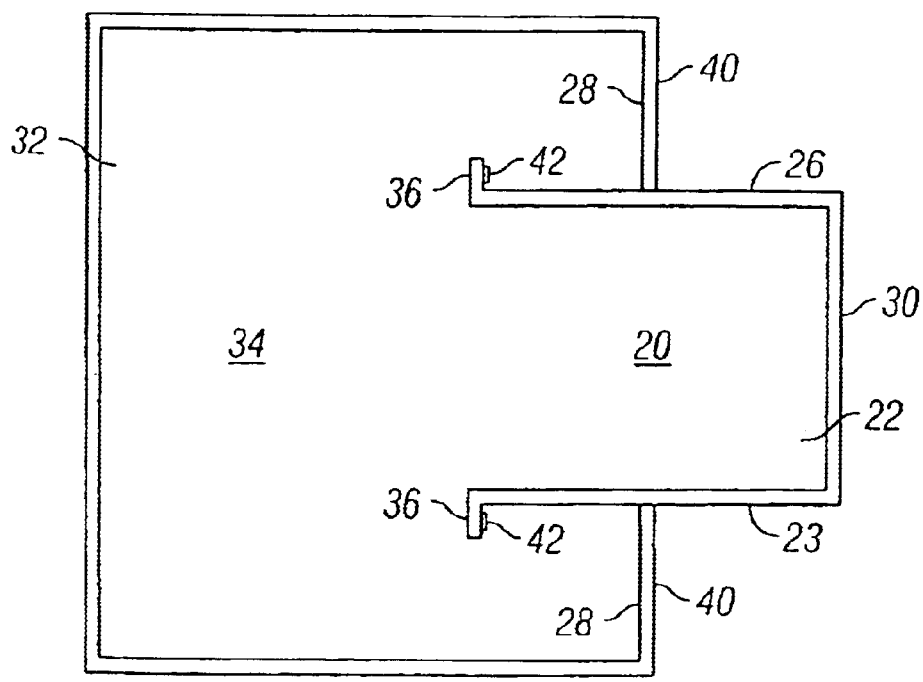
FIG. 1B is a plan top view of the prior art trailer shown in FIG. 1A.
Figure 2A:
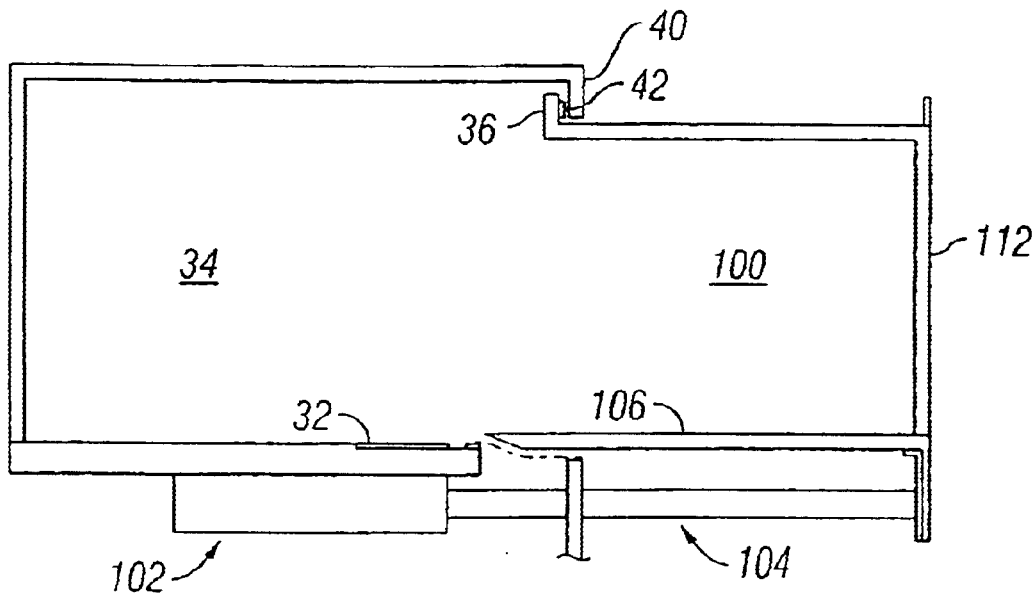
FIG. 2A is a plan side view of a prior art trailer with a slide-out room having flush flooring.
Figure 2B:
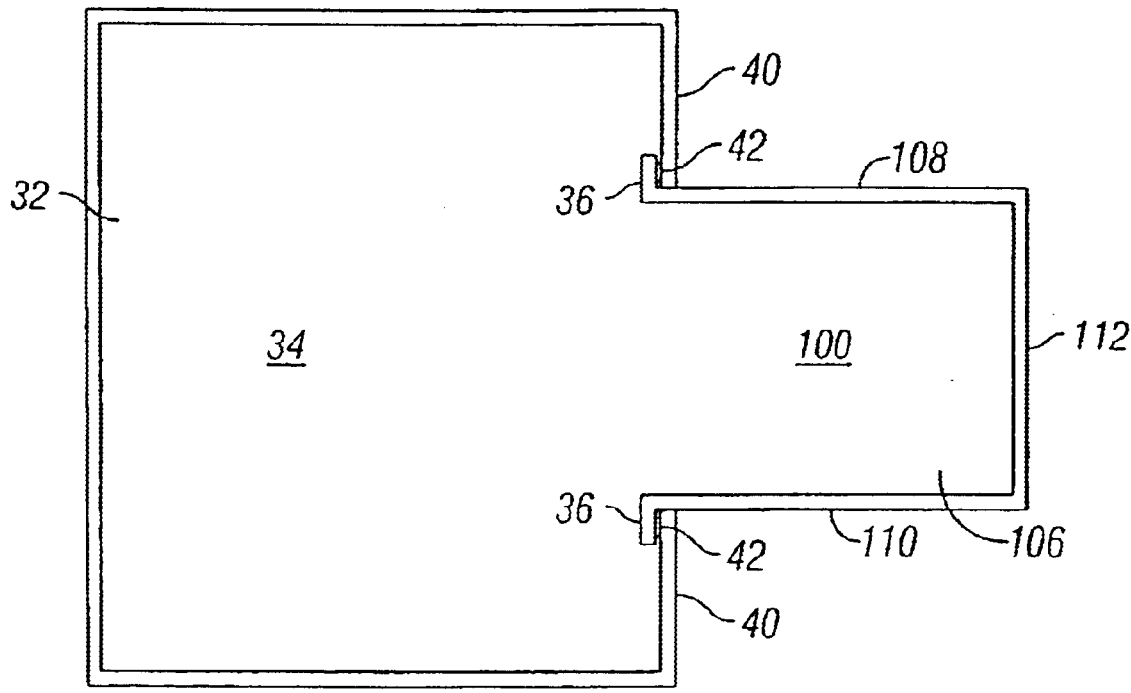
FIG. 2B is a plan top view of the prior art trailer shown in FIG. 2A.
Figure 3A:
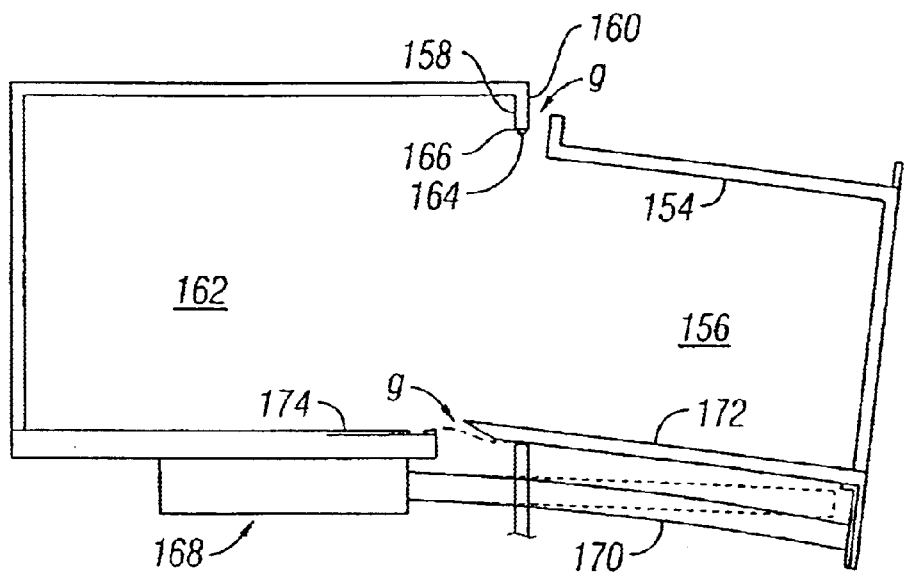
FIG. 3A is a plan side view of a prior art trailer with a slide-out room having flush flooring, and sidewalls.
Figure 3B:
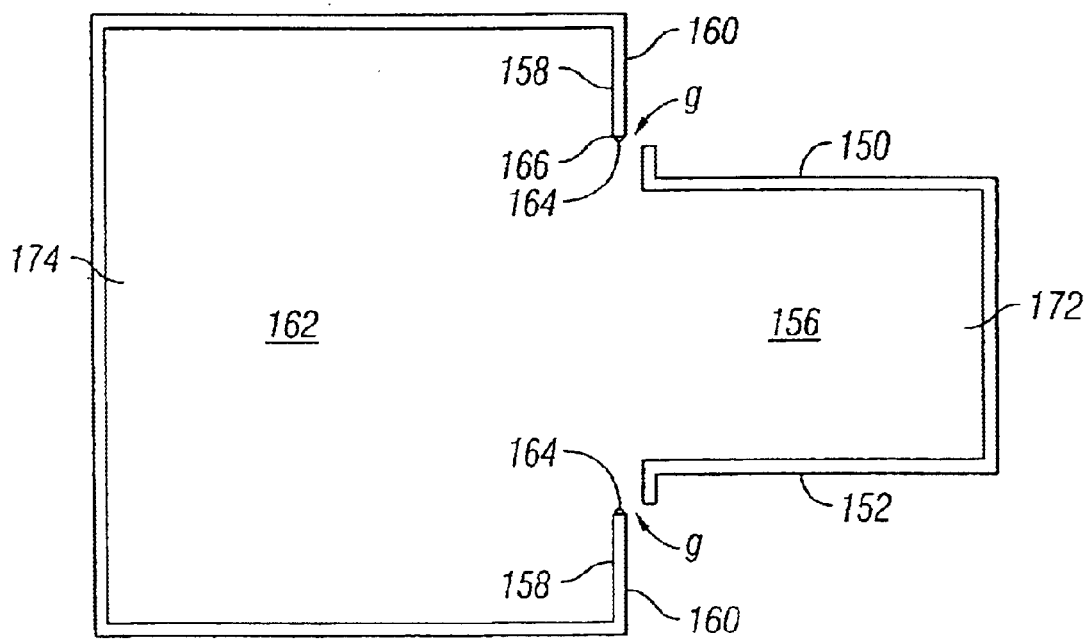
FIG. 3B is a plan top view of the prior art trailer shown in FIG. 3A.
Figure 4:
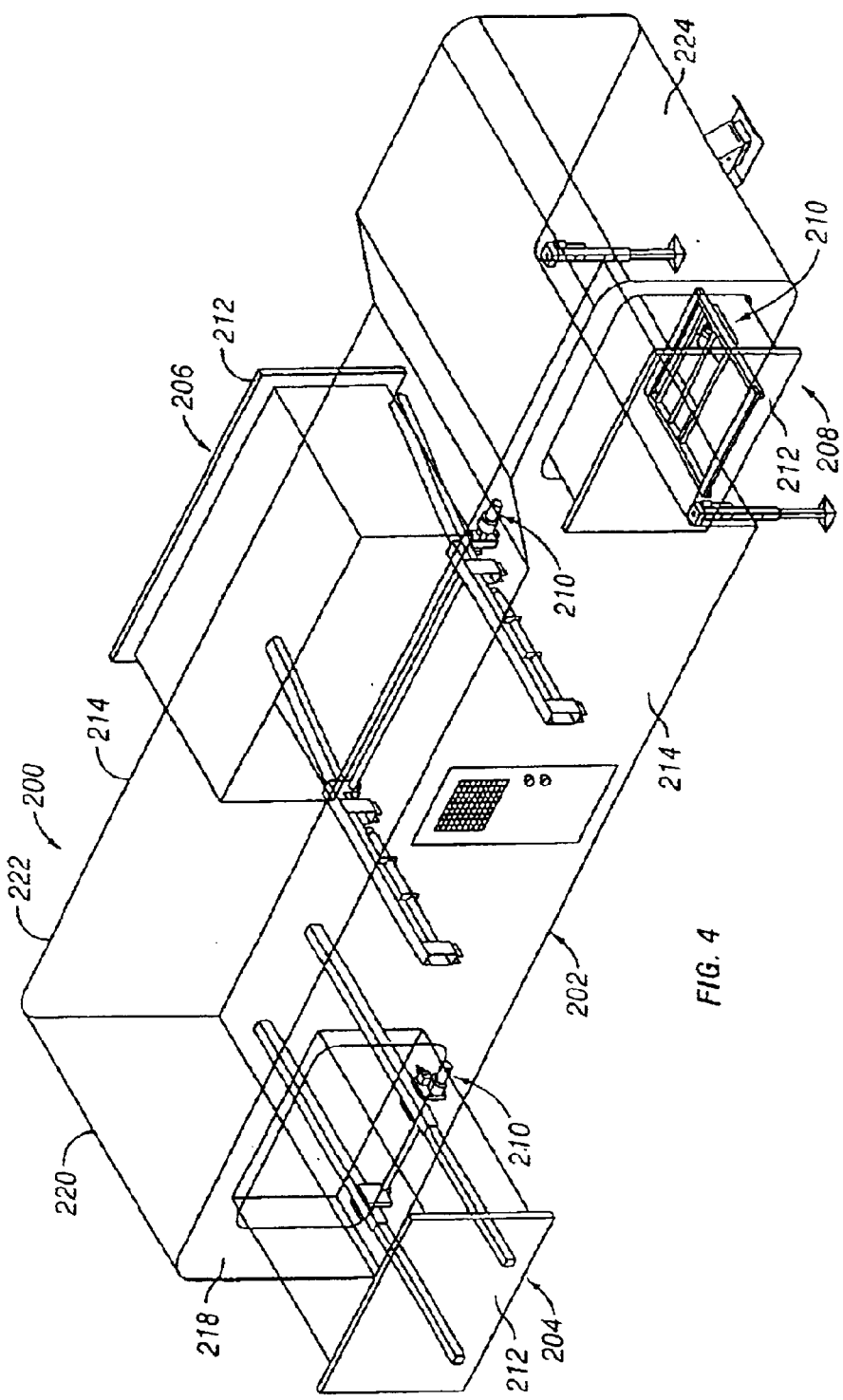
FIG. 4 is a perspective view of a trailer having several slide-out rooms in accordance with the present invention.

Referring to FIG. 4, a trailer 200 in accordance with the present invention is illustrated having a fixed room 202 and three slide-out rooms 204, 206, 208 mounted for expansion on the left and right side of the fixed room 202. The fixed room 202 typically forms a living and/or dining room area and is stationary relative to the trailer 200, while the slide-out rooms 204, 206, 208 are movable relative to the trailer 200 and the fixed room 200 by slide-out extension mechanisms 210 which extend the slide-out rooms 204, 206, 208 in a cantilevered manner. In retracted positions, the slide out rooms 204, 206, 208 are telescopically received or nested within the fixed room 202. In the preferred embodiment, the exterior face 212 of slide-out rooms 204, 206, 208 are flush with the exterior sides 214 of the fixed room 202 when in a fully retracted position.

Figure 5A:
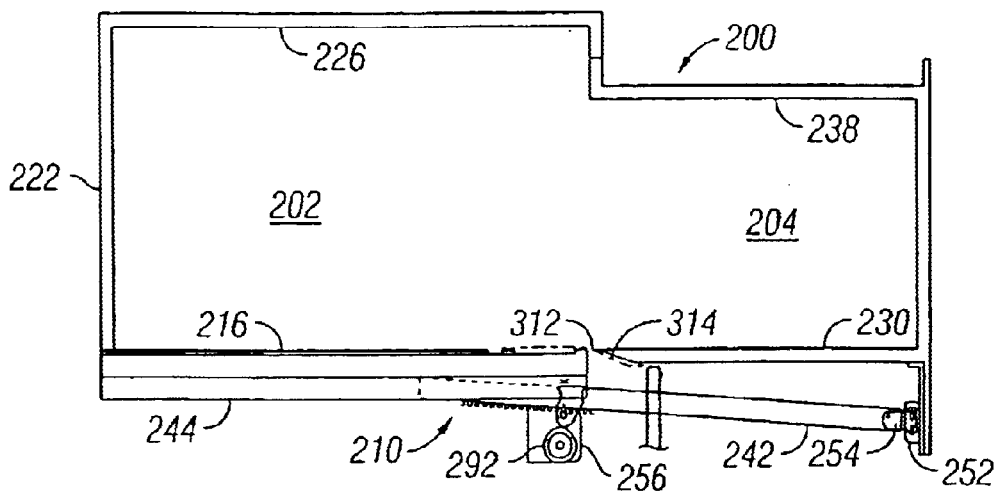
FIG. 5A is a plan side view of the trailer illustrating one of the slide-out rooms shown in FIG. 4 in a fully extended position.
Figure 5B:
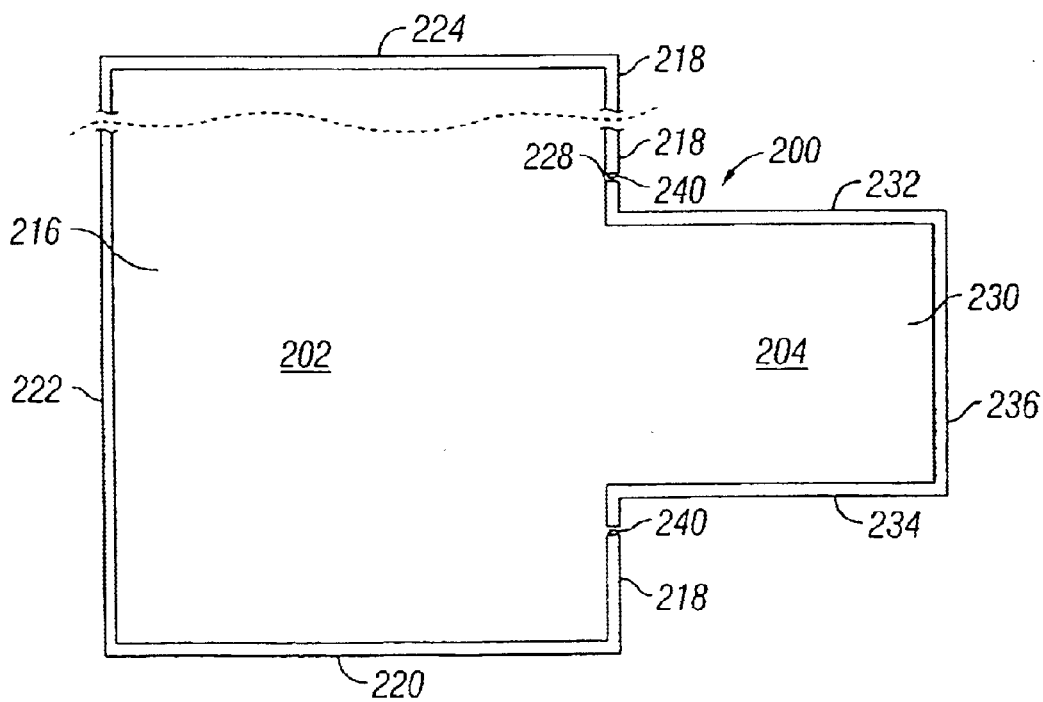
FIG. 5B is a plan top view of the trailer shown in FIG. 5A.

FIGS. 5A and 5B illustrate one of the slide-out rooms 204 in the full extended position relative to the fixed room 202, and FIGS. 6A–6C illustrate an interior view of the slide-out room 204 in a fully retracted position, an intermediate position, and a fully extended position. The fixed room 202 includes a floor section 216, four sidewall sections 218, 220, 222, 224, and a roof section 226. The sidewall sections 218, 220, 222, 224 form part of the exterior sides of the trailer 200 and the first sidewall section 218 of the fixed room 202 includes an opening 228 through which the slide-out rooms 204 retracts and extends through. The slide-out room 204 includes a floor section 230, a first sidewall section 232, a second 'sidewall section 234, a third sidewall section 236, and a roof section 238. In the fully retracted position, the roof section 238 and two of the sidewall sections 232, 234 of the slide-out room 204 are typically concealed from exterior view, and the third sidewall section 236 forms a portion of the respective sidewall 218 of the trailer 200. At the same time, the floor section 230 of the slide-out room 204 typically rests above the floor section 216 of the fixed room 202 and may form a portion of the usable interior floor during trailer transit. Similarly, the roof section 238 of the slide-out room 204 may define the interior ceiling of that part of the trailer 200 during transit. To provide an aesthetically pleasing interior when in the fully extended position, a flush wall system is provided, wherein the proximal end of the slide-out room 204 is flush with the interior surface of the respective sidewall section 218 of the fixed room 202. A seal 240, such as a bulb seal, is attached to an edge wall the opening 228. The seal 240 is capable of sealing the interior of the trailer 200 from the weather when the slide-out room 204 is in the retracted position, extended position, and any intermediate position. In addition to providing an aesthetically pleasing interior, the flush wall system enables the interior width of the trailer to be maximized when the slide-out room 204 is in the fully extended position.

Figure 7:
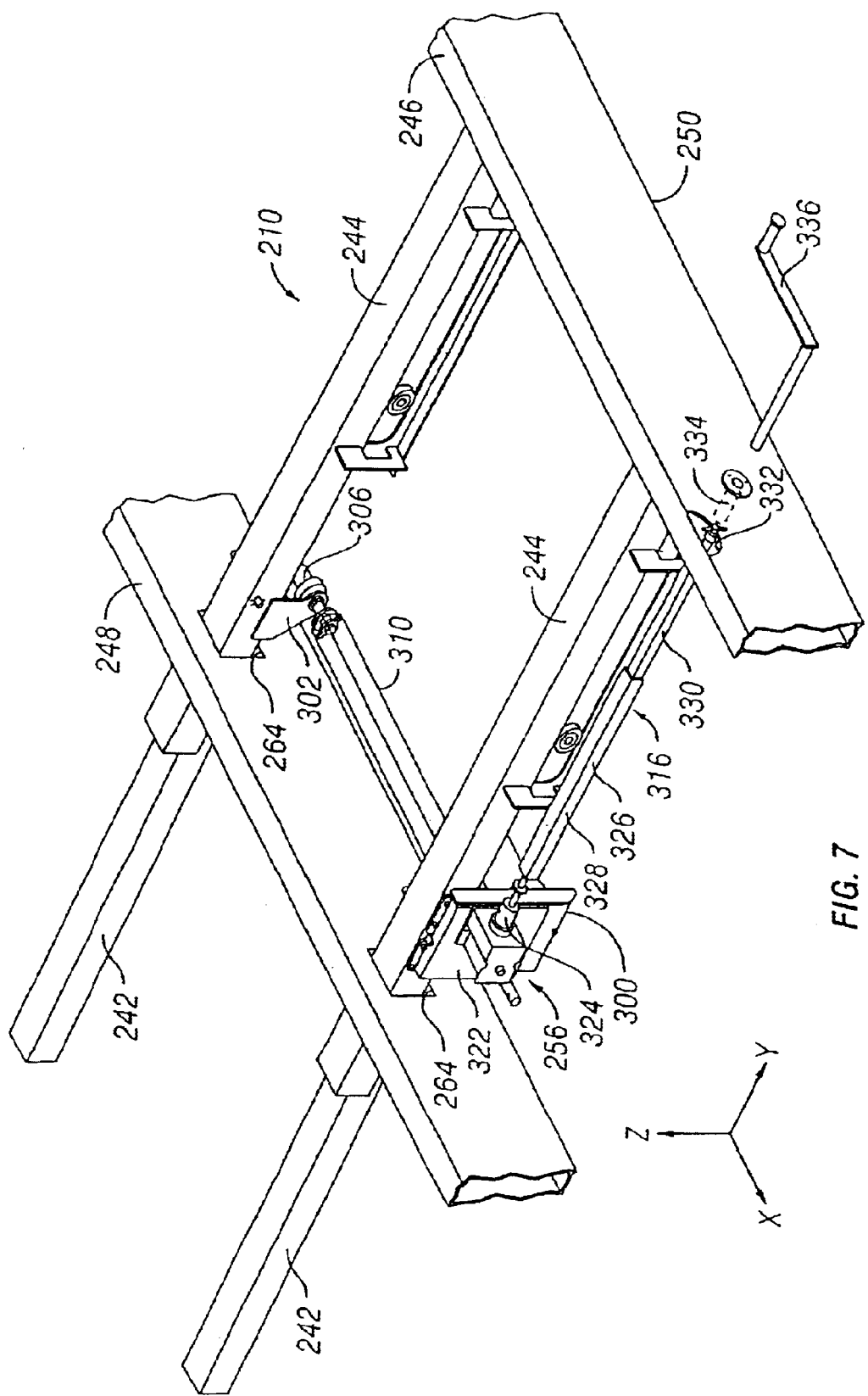
FIG. 7 is a perspective view of a slide-out extension mechanism for the slide-out room shown in FIG. 5.
Figure 12:
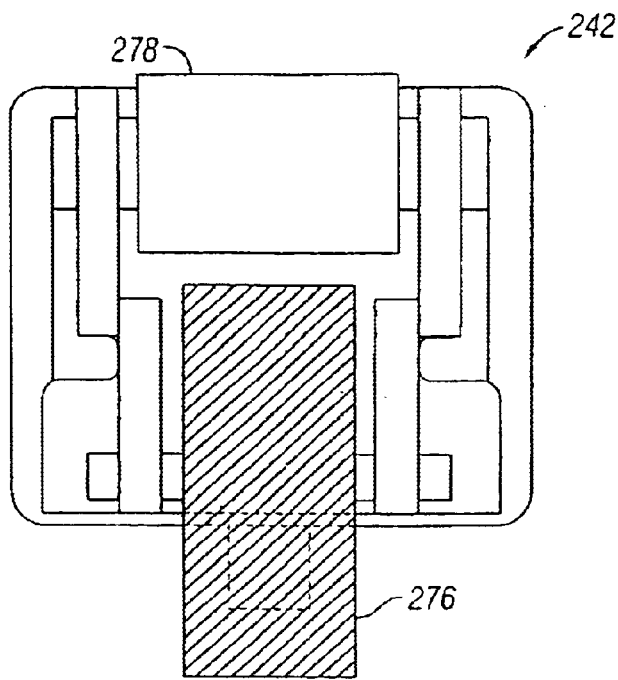
FIG. 12 is a plan front view of the support rail shown in FIGS. 8, 9, and 10.

As best shown in FIGS. 7, 8 and 9, the slide-out extension mechanism 210 includes a pair of parallel tubes or support rails 242 slidably carried in a pair of hollow parallel tubes or channels 244 for longitudinal translation therethrough. The pair of channels 244 are spaced apart along the length of the fixed room 202 and are aligned such that their length in the longitudinal direction is along the line of expansion and retraction of the slide-out room 204. The channels 244 are connected to the fixed room 202 by a pair of transverse structural members 246, 248 which form part of the frame 250 of the trailer 200. The proximal end of the channels 244 are connected to the first transverse structural member 246 and a distal portion of the channels 244 are connected to the second transverse structural member 248. The support rails 242 are mounted within the channels 244, and distal ends of the support rails 242 are mounted to the distal portion of the slide-out room 204 by a slot member 252 and a pivot member 254. A drive mechanism 256 is attached to the channels 244 and provides selected extension or retraction of the support rails 242. However, it is noted that the orientation of the channels and support rails can be reversed such that the support rails are attached to the fixed room, and the channels are attached to the slide-out room.

Referring back to FIG. 8, each of the channels 244 has a closed upper wall 258, closed sidewalls 260, and a lower wall 262 which covers a proximal portion of the channel 244. The remaining distal portion of the channel 244 is left open. The proximal end of the channels 244 are welded to the first transverse structural member 246, while the distal portion of the channels 244 are passed through a pair of apertures 264 of the second transverse member 248 where they are welded in place.

Referring to FIGS. 10A–10C, each of the support rails 242 includes a pair of tubes 266 having a closed upper wall 266, closed sidewalls 268, and a closed lower wall 269. A gear rack 270 is disposed between the tubes 266. The gear rack 270 includes a wall portion 271 and a gear portion 272. The wall portion 271 may be formed from a steel plate extending throughout the entire length and depth of the tubes 266, and the gear portion 272 projects downwardly from each of the closed lower walls 269. The gear rack 270 may be integrally formed with the steel plate or may be attached to the steel plate by welding or the like. As can be seen in FIG. 10C, the upper portion of the steel plate is flush with the upper walls 267 of the tubes 266, and the lower portion of the steel plate is flush with the lower walls 269 of the tubes 26. The gear rack 270 engages with an associated gear of the drive mechanism 256 which is to be described hereafter.

As best shown in FIGS. 8, 9, and 11, each support rail 242 includes a proximal roller arrangement 274 to slidably carry the support rails 242 within the channels 244. The proximal roller arrangement 274 includes a lower wheel 276 which is in continuous rolling engagement with the lower wall 262 of the channel 244 and further includes an upper roller 278 which is in continuous rolling engagement with the upper wall 258 of the channel 244. A distal roller arrangement 280 is rotatably mounted to the channel 244 and includes a roller 282 supported by the sidewalls 260 of the channel 244. The roller 282 is in continuous rolling engagement with the upper walls 267 of the support rails 242. The proximal and distal roller arrangements 274, 280 and drive mechanism 256 thus provide vertical support for the slide-out room 204 when retracted and at the same time permit smooth, low friction in-and-out telescopic movement of the slide-out room 204 relative to the fixed room 202. In this way, the slide-out 204 room has a slidable, cantilever mounting to the fixed room 202.

As best shown in FIGS. 11A–11C, an alternative embodiment of a support rail 283 includes the pair of tubes 266 having a closed upper wall 267, closed sidewalls 268, and a closed lower wall 269. The tubes 266 are directly secured to each other such that the closed sidewall 268 of the first tube 266 directly abuts against the closed sidewall 268 of the second table 266. A gear portion 285 projects downwardly from each of the closed lower walls 269 and engages with an associated gear of the drive mechanism 256.

As mentioned previously, there is a growing trend to provide larger slide-out rooms with flush floors and sidewalls. It is particularly important to provide a rigid slide-out extension mechanism to prevent unwanted bouncing of the slide-out room resulting from movement of the occupants and to prevent flexural bending of the floor section. Unfortunately, such structures can be overly complicated, expensive and relatively heavy. Excessive complexity, expense, and weight may be reduced by preferentially increasing the rigidity of the slide-out mechanism where needed. It has been determined that existing slide-out extension mechanisms are usually sufficiently rigid in the x-y directions but require additional rigidity in the z direction. Bending rigidity of the support rails in the z direction is primarily dependent upon the wall thickness of the vertically oriented sides A while bending rigidity in the x-y directions are primarily dependent upon the wall thickness of the horizontally oriented sides B. Thus, the support rails can be formed from tubing having a rectangular cross section with vertically oriented walls thicker than the horizontally oriented walls to preferentially increase the bending stiffness (also known as flexural rigidity) in the z-direction without substantially increasing the weight of the support rails. However, to further reduce costs, the support rails 242 shown in FIG. 10C utilize standardized tubes 266 which are joined together to form the support rail 242 having vertically oriented walls 268 twice the thickness of the horizontally oriented walls 267, 269. In this manner, standardized tubes 266 having a uniform wall thickness may be utilized instead of custom fabricated tubes. It is also noted that the gear rack 270 further increases the rigidity of the support rails 242 in the z direction by further increasing the combined thickness of the vertically oriented walls.

Figure 13:
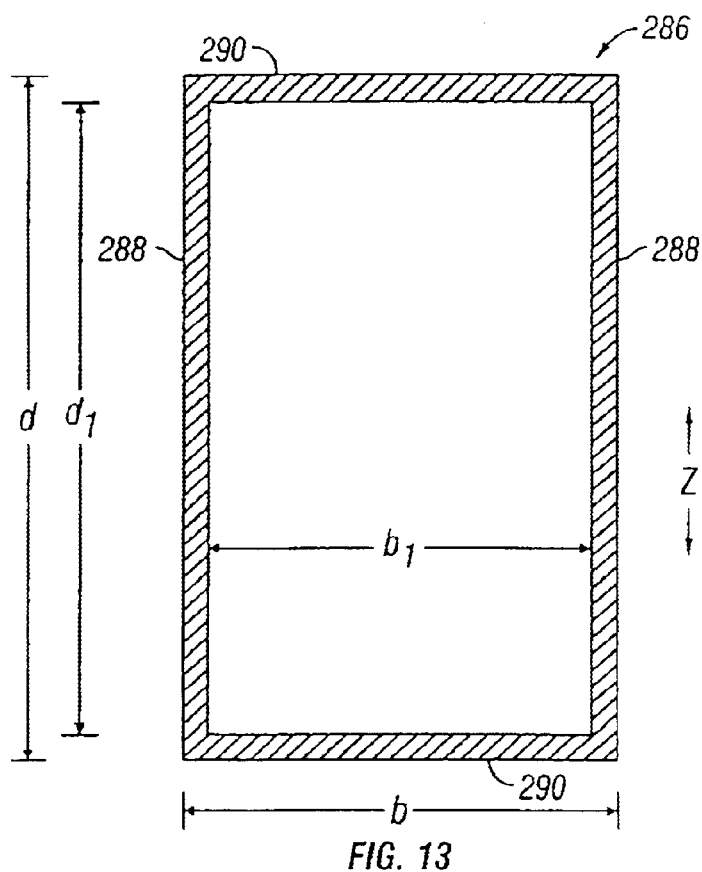
FIG. 13 is a cross sectional view of an exemplary support tube.

Referring to FIG. 13, bending stiffness of a typical tube 286 in the z direction may be characterized by calculating the product of the moment of inertia (I) and the modulus of elasticity (E) of the tube 286. When the tube 286 is subjected to a load such as the weight of a slide-out room, the moment of inertia I for the tube 286 is given by:

$$I_{tube}=bd^3/12-b_1 d_1^3/12$$

where b is the outer width of the tube 286, $b_1$ is the inner width of the tube 286, d is the outer depth of the tube 286, $d_1$ is the inner depth of the tube 286.

The modulus of elasticity $E_{tube}$ for the typical tube 286 formed from steel is approximately $30 \times 10^6$ psi, and the bending stiffness of the tube 286 is given by:

$$\text{bending stiffness}_{tube}=E_{tube} \bullet I_{tube}=(30 \times 10^6)(bd^3/12-b_1 d_1^3/12).$$

As can be seen from the above formula, bending stiffness in the z direction is primarily dependent upon the thickness of the vertically oriented walls 288, wherein bending stiffness is linearly dependent upon the horizontal wall 290 thickness and cubicly dependent upon the vertical wall thickness 288. For example, the bending stiffness of a tube 286 in the z direction can be increased by a factor of eight by doubling the thickness of the vertically oriented walls 288 while maintaining the thickness of the horizontally oriented walls 290 at the original thickness. Bending stiffness can be further increased by only a factor of two by doubling the thickness of the horizontally oriented walls 290. As a result, by doubling the vertical wall 288 thickness, a fifty percent increase in tube 286 weight will result in an eight fold increase in bending resistance in the z direction, while an additional fifty per cent increase in tube weight by doubling the horizontal wall thickness will result in only a two fold increase in bending resistance in the z direction. Thus, it is desirable to preferentially increase the vertical wall 288 thickness. Of course, the horizontal wall 290 thickness should be thick enough to provide adequate bending stiffness in the x-y direction and to provide adequate torsional stiffness.

Figure 14:
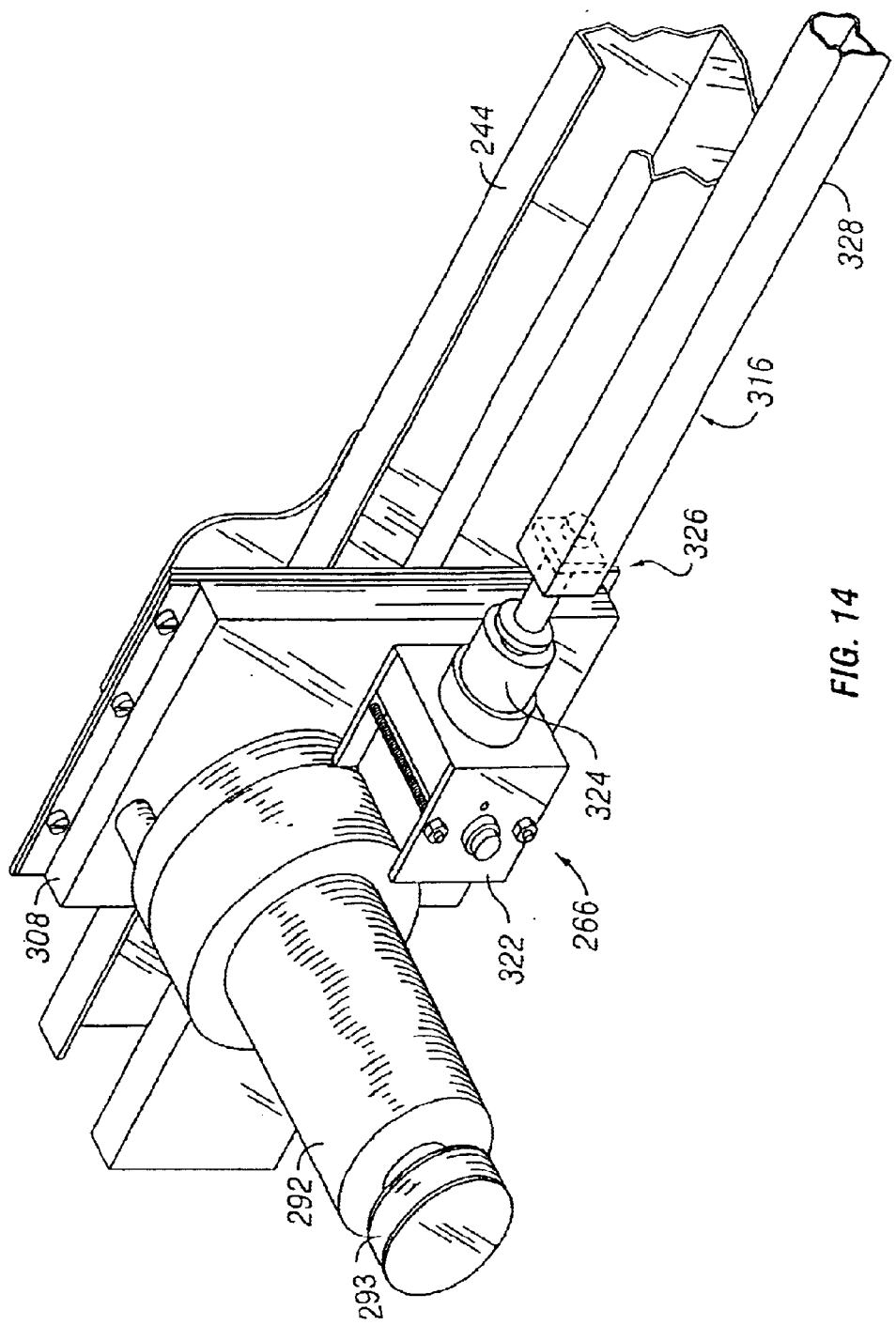
FIG. 14 is an enlarged view of the drive mechanism shown in FIGS. 7, 8, and 9.
Figure 15A:
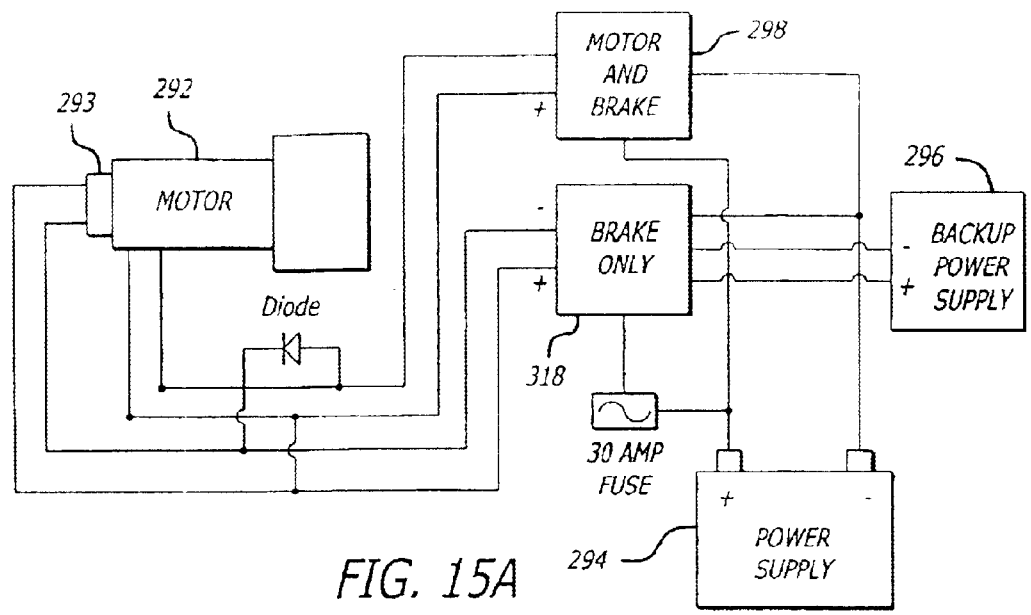
FIG. 15A is a circuit diagram for the slide-out extension mechanism shown in FIG. 7.
Figure 15B:
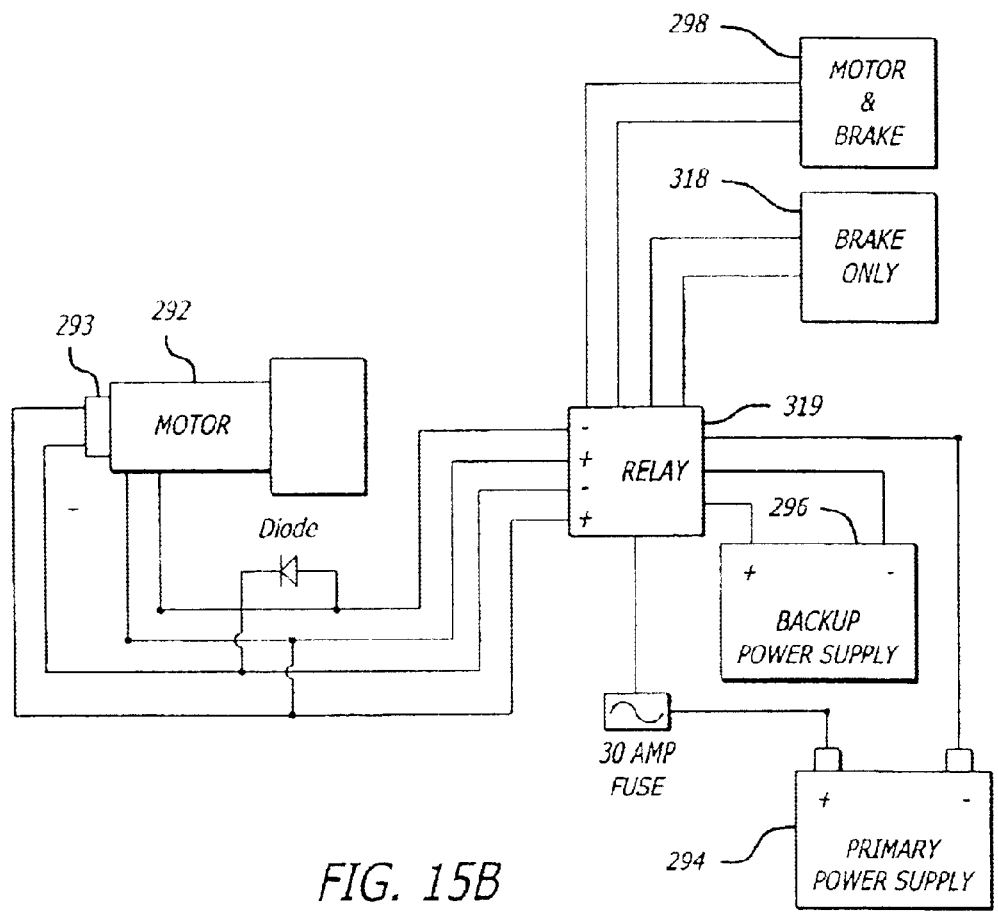
FIG. 15B is an alternative circuit diagram for the slide-out extension mechanism shown in FIG. 7.

Referring back to FIG. 7 and to FIGS. 14 and 15, the slide-out room 204 is usually automatically extended and retracted by the drive mechanism 256 which includes a motive device. In the exemplary embodiment, the motive device is an integral motor/brake 291. The power source for the integral motor/brake 291 is a primary power supply 294 such as a standard 12-Volt lead/acid battery commonly found in motor vehicles. Other types of batteries may be used such as nickel cadmium, lithium ion, air-Zinc, solid or semi-solid polymer batteries, collection of batteries in battery packs, as well as batteries having rated voltages other than 12 Volts. The integral motor/brake 291 includes an electric motor 292 manufactured by Von Weise under model number V05726AP88 and an external brake 293 manufactured by Stearns. The external brake 293 comprises an electrically controlled, spring-biased brake. When electrical power to the integral motor/brake 291 is terminated, the external brake 293 automatically and positively clamps an output shaft (not shown) of the electric motor 292 against further rotation to positively fix the position of the slide-out room 204 and to prevent unnecessary over-travel and imprecise control of the slide-out room 204 by inertial rotation of the motor output shaft. Furthermore, the external brake 293 maintains the slide-out room 204 in a fully retracted position during travel of the trailer 200, prevents the slide-out room 204 from moving away from the fully extended position, and ensures proper synchronism of the support rails 242 to prevent binding and jamming of the slide-out extension mechanism 210. Preferably, a motor/brake switch 298 to activate the electric motor 292 and the external brake 293 is located in the interior portion of the trailer 200, but it may be located in any other convenient location such as an exterior surface of the fixed room 202 near the respective slide-out room 204. Furthermore, the brake/motor switch 298 may be remotely activated by radio transmission if desired.

The drive mechanism 256 further includes a first housing 300 mounted to one of the channels 244 and a second housing 302 mounted to the other channel 244. A first drive gear 304 is rotatively mounted to the first housing 300, and a second drive gear 306 is rotatively mounted to the second housing 302. Each of the drive gears 304, 306 is in meshing engagement with its respective gear rack 270 such that rotation of the drive gears 304, 306 causes the support rails 242 to slide in-and-out of their respective channels 244. The drive gears 304, 306 are driven by the electric motor 292, and the electric motor 292 is mounted to the first housing 300. The output shaft of the electric motor 292 is connected to a gear reducing assembly 308, and the gear reducing assembly 308 is coupled to the first drive gear 304. The second drive gear 306 is coupled to the first drive gear 304 by a drive shaft 310 such that rotation of the first drive gear 304 causes the second drive gear 306 to similarly rotate.

As best shown in FIG. 8, a centerline height a of the proximal end of the support rail 242 is higher than a centerline height b of the support rail 242 at the drive gear 304 by a distance c. Thus, the centerline height d of the distal end of the support rail 242 incrementally decreases at an inclined slope as the support rail 242 is further extended. In addition, a sloped end region 312 abuts the floor section 216 of the fixed room 302, and the floor section 230 of the slide-out room 204 includes a mating inclined surface 314 (see FIG. 5A). With such an arrangement, as the slide-out room 204 is extended from its retracted position, the floor section 230 of the slide-out room 204 is lowered in a smooth manner from its position above the floor section 216 of the fixed room 202 to a position flush with the floor section 216 of the fixed room 202. As used herein, the term "flush" is interpreted as respective surfaces being in a substantially same plane without a noticeable elevation between them. For example, the floor section 230 of the slide-out room 204 is flush with the floor section 230 of the fixed room 202 when the top surfaces of the floor sections 216, 230 are substantially in the same plane.

As a backup system (see FIGS. 7, 14, and 15A), the slide-out extension mechanism 210 includes a manual override system 316 to extend and retract the slide-out room 204 relative to the fixed room 202. In the event the electric motor 292 is inoperable, the slide-out room 204 may still be operated by the manual override system 316 which is conveniently accessible. Since the external brake 293 is in the locked mode when deactivated, a brake-only switch 318 is provided to activate the external brake 293 into the release mode. The brake-only switch 318 is coupled to the primary power supply 294. However, if the primary power supply 294 is dead or insufficiently charge to activate the external brake 293, a backup power supply 296 is coupled to the brake only switch 318 to provide sufficient power to activate the external brake 293. In the exemplary embodiment, the backup power supply 296 can be a standard 9-Volt battery. Furthermore, a relay 319 may be provided to couple the electric motor 292 and external brake 293 to the motor/brake switch 298, brake-only switch 318, primary power supply 294, and backup power supply 295 (see FIG. 15B).

As best shown in FIGS. 7 and 14, the manual override system 316 includes a right angle gear box 322 mounted to the gear reducing assembly 308. The right angle gear box 322 provides an enclosure for a gear system having a bevel gear (not shown) mounted for rotation with the gear reducing assembly 308 and in meshing engagement with a bevel pinion 324 secured at the end of a crankshaft 326. The crankshaft 326 includes a central square tube 328 and a telescoping section 330. The telescoping section 330 has a square cross section portion slidably received within a passage defined by the central square tube 328. The crankshaft 326 extends generally perpendicularly with the drive shaft 310. The end of the crankshaft 326 opposite the right angle gear box 322 passes through an aperture 332 of the first transverse structural member 246 and is received within a lead-in-tube 334 mounted to the first transverse structural member 246. The lead-in tube 334 is positioned at a readily accessible location so that an operator may easily insert a removable crank handle 336 to manually retract/extend the slide-out room 204. The crank handle 336 is engageable with the second end of the crankshaft 326. Rotation, of the crank handle 336 rotates the bevel pinion 324, which in turn rotates the gear system of the right angle gear box 322, rotates the gears in the gear reducing assembly 308, and rotates the drive gears 304, 306 in order to manually extend or retract the slide-out room 204. It is noted that the configuration of the manual override system may vary depending on the location slide-out room relative to the vehicle.

The slide-out room 204 is operated in the following manner. With the slide-out room 204 in the fully retracted position, the operator sets the motor/brake switch 298 to the "on" position. The electric motor 292 and external brake 293 are energized, and the support rails 242 extend outwardly from the channels 244. Since each support rail 242 is being driven at the same speed, binding of the slide-out extension mechanism 210 can be avoided even with relatively long slide-out room structures. As the support rails 242 extend outwardly from the channels 244, the proximal end of the support rails 242 slide laterally but remain at a fixed height while the distal end of the support rails 242 move both laterally and vertically downward at an inclined slope. Since the slide-out room 204 is connected to the distal end of the support rails 242 by the pivot member 254 and the slot member 256, the slide-out is room 204 is extended laterally while remaining at a fixed height. The vertical reduction in height of the distal end of the support rails 242 are compensated by the pivot member 254 and slot member 256. When the slide-out room 204 is near the fully extended position, the mating inclined surface 314 of the floor section 230 of the slide-out room 204 slides downwardly along the sloped end region 312, and the pivot member 354 and slot member 256 compensate for the vertically downward movement of the slide-out room 204 such that the floor section 230 of the slide-out room 204 remains in a substantially horizontal position during the transition. At the fully extended position, the floor sections 216, 230 of the slide-out room 204 and fixed room 202 are flush. The motor/brake switch 298 is automatically reset to the "off" position, and the electric motor 292 is automatically deactivated and the external brake 293 is engaged to positively lock the slide-out room 204 in the fully extended position.

The slide-out room 204 is moved from the fully extended position to the fully retracted position by similar steps. The motor/brake switch 298 is set to the "on" position, the electric motor 292 and external brake 293 are energized, and the support rails 242 retract inwardly into the channels 244 at the same speed. As the support rails 242 retract, the proximal end of the support rails 242 slide laterally but remain at a fixed height while the distal end of the support rails 242 move both laterally and vertically upward at an inclined slope. At the same time, the slide-out room 204 is retracted laterally, wherein the proximal end of the slide-out room 204 is raised as the mating inclined surface 314 of the slide-out room 204 slides upwardly along the sloped end region 312. The floor section 230 of the slide-out room 204 remains substantially horizontal because the slot member 252 allows the distal end of the slide-out room 204 to rise an equal amount and because the pivot member 254 pivots about the support rail 242. When the mating inclined surface 314 of the slide-out room 204 clears the sloped end region 312, the floor section 230 of the slide-out room 204 slides along the floor section 216 of the fixed room 202. At the fully retracted position, the floor section 230 of the slide-out room 204 is once again positioned above the floor section 216 of the fixed room 202, and the outer surface of the third sidewall section 236 of the slide-out room 204 is flush with the outer surface of the respective sidewall section 218 of the fixed room 202. The motor/brake switch 298 is automatically set to the "off" position, the electric motor 292 and the external brake 293 are de-energized, and the slide-out room 204 is positively locked by the external brake 293. It is noted that the slide-out room 204 may be partially extended or retracted by manually setting the motor/brake switch 298 to the "off" position during the extension/retraction of the slide-out room 204.

In the event that the electrical motor 292 is inoperable such as when the primary power supply 294 is incapable of delivering sufficient power to drive the electric motor 292, the manual override system 316 may be used to retract or extend the slide-out room 204. Before manual rotation of the drive shaft 310 can be accomplished, it is necessary for the operator to release the external brake 293. The brake-only switch 318 is set to the "on" position to release the external brake 293. The backup power supply 296 may be used when the primary power supply 294 is insufficiently charged. If the slide-out room 204 is in the fully retracted position and the operator wishes to fully extend the slide-out room 204, the operator may insert the crank handle 336 into the lead-in tube 334 and rotate the crank handle 336 until the slide-out room 204 is fully extended. The slide-out extension mechanism 210 operates in a manner similar to the above-mentioned procedure for automatically extending and retracting the slide-out room 204. After the slide-out room 204 is fully extended, the brake-only switch 318 is repositioned to the "off" position, and the external brake 293 positively locks the slide-out room 204. Similarly, the slide-out room 204 may be manually retracted from the fully extended position by setting the brake-only switch 318 to the "on" position to release the external brake 293, inserting the crank handle 336 into the lead-in tube 334, and rotating the crank handle 336 until the slide-out room 204 is fully retracted. After the slide-out room 204 is fully retracted, the brake-only switch 318 is set to the "off" position, and the external brake 293 positively locks the slide-out room 204. It is noted that the slide-out room 204 can be manually retracted/extended to any desired intermediate position by simply terminating the rotation of the crank handle 336 when slide-out room 204 is retracted/extended to the desire position and setting the brake only switch 318 to the "off" position.

Figure 16A:
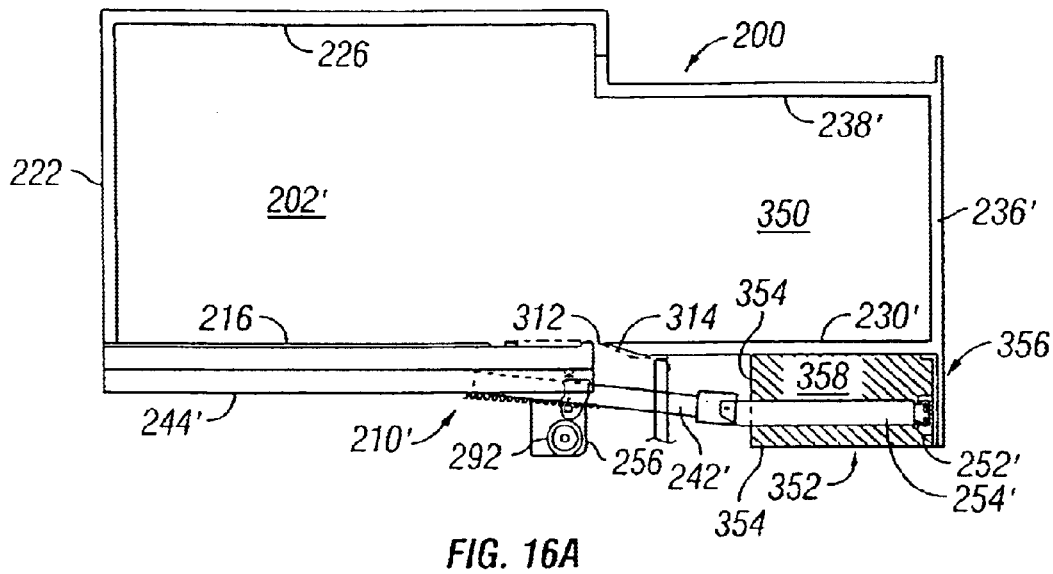
FIG. 16A is a plan side view of a trailer illustrating another embodiment of a slide-out room in accordance with the present invention.
Figure 16B:
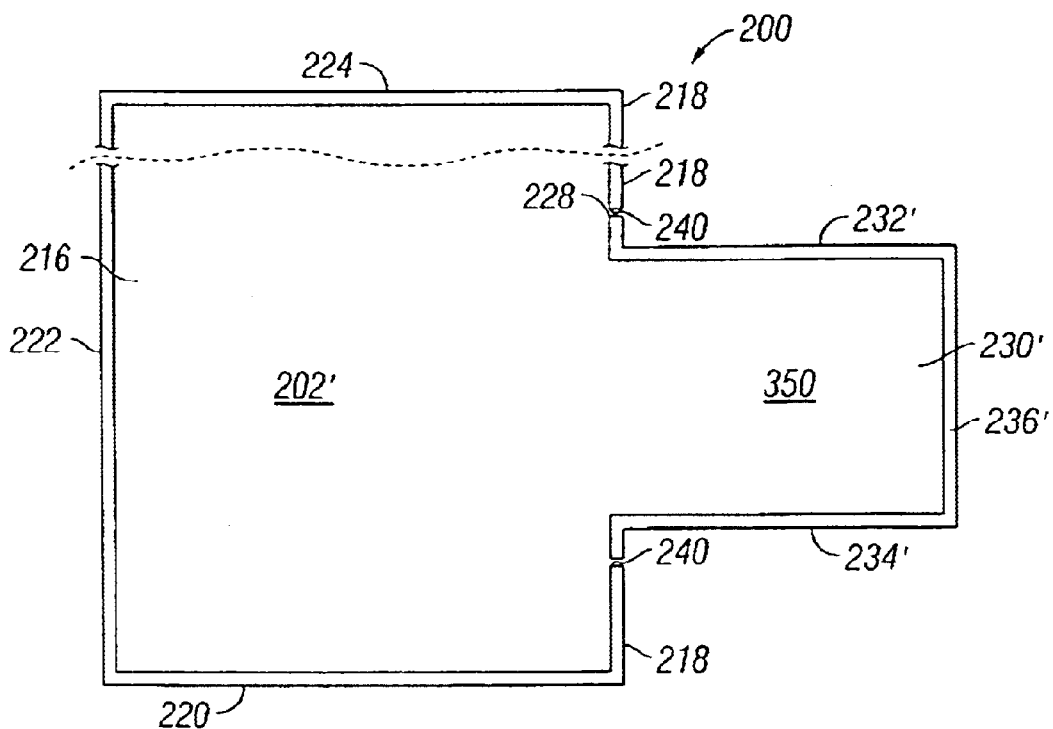
FIG. 16B is a plan top view of the trailer shown in FIG. 16A.
Figure 17:
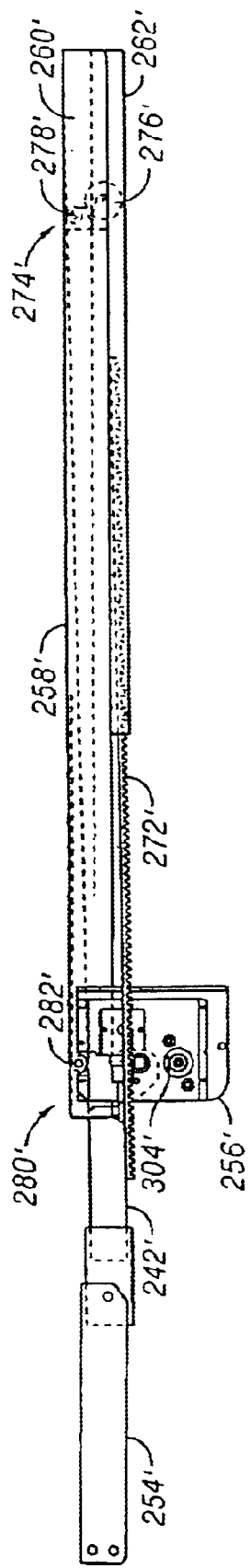
FIG. 17 is a plan view of a portion of the slide-out extension mechanism shown in FIG. 16A.
Figure 18:
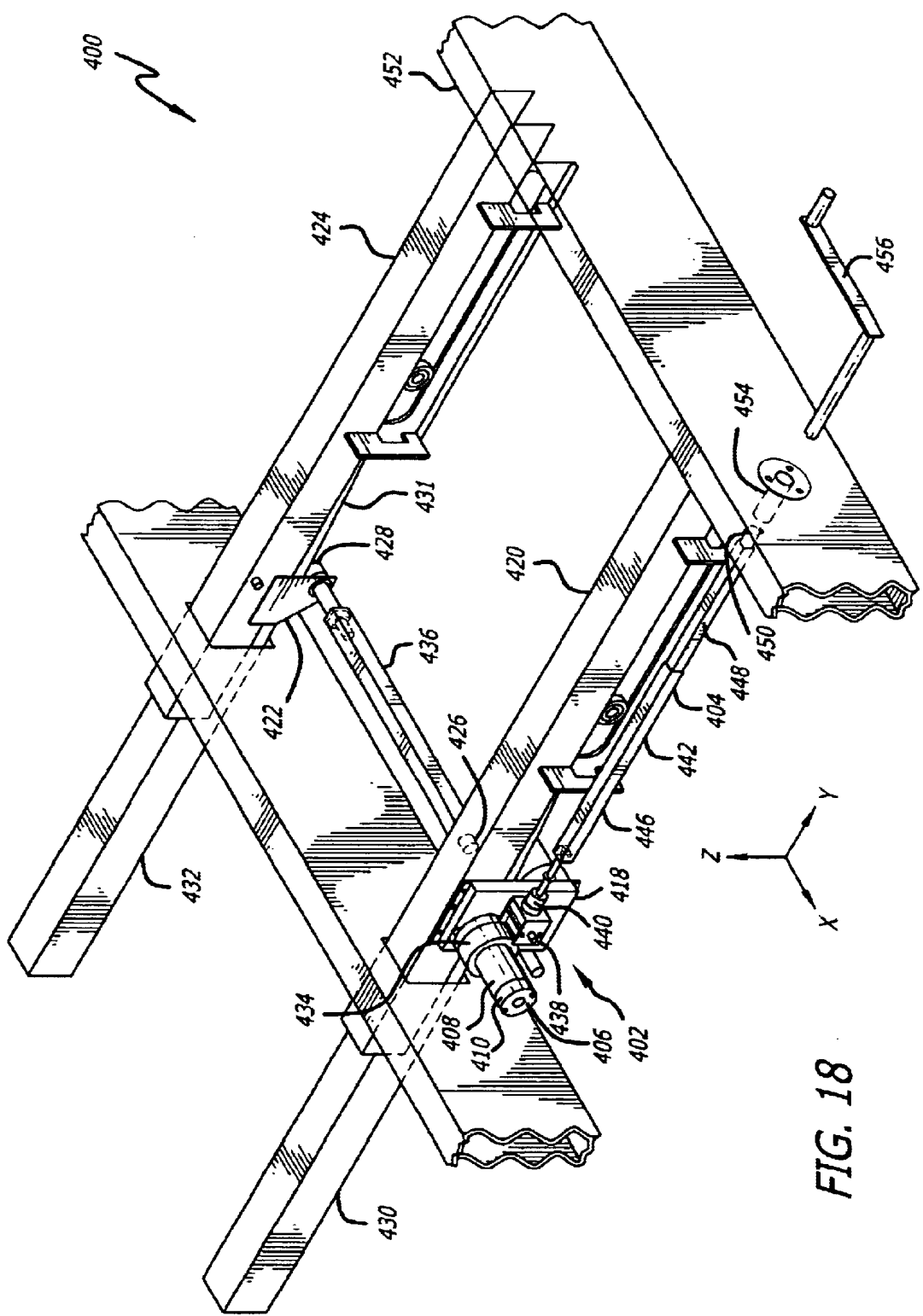
FIG. 18 is a perspective view of another embodiment of a slide-out extension mechanism having a drive mechanism and a manual override system in accordance with the present invention.
Figure 19A:
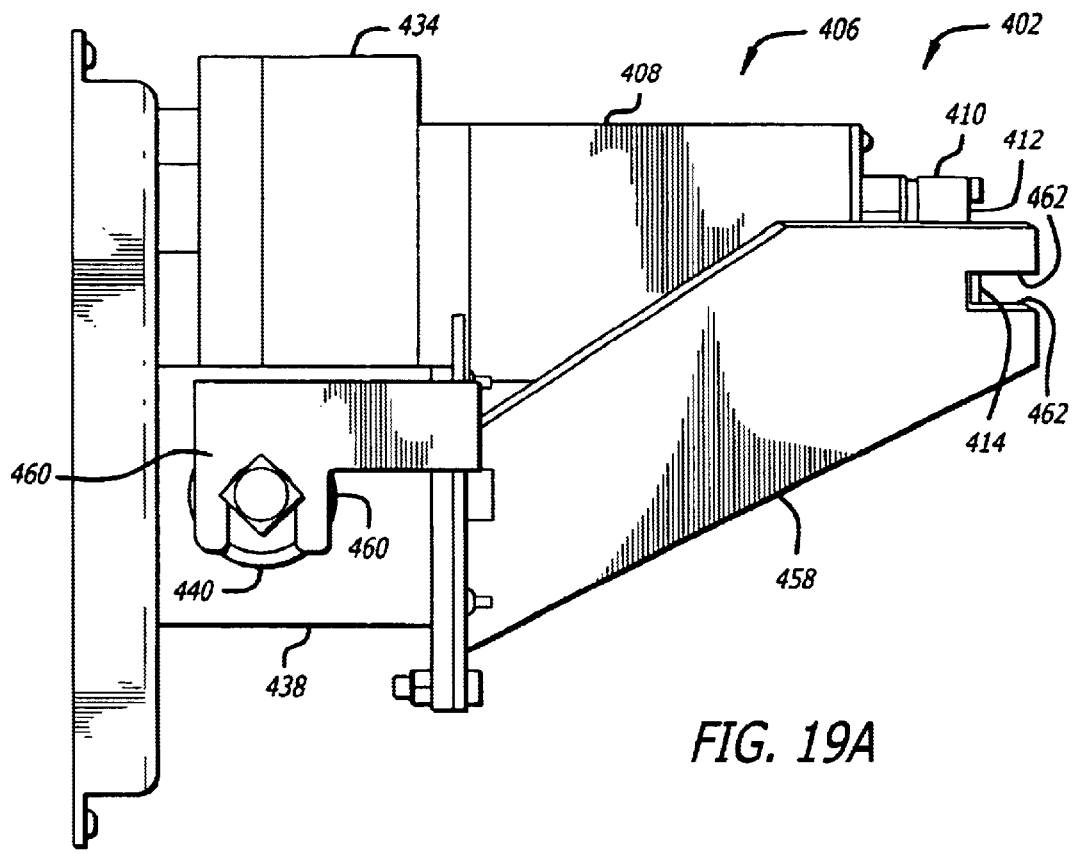
FIGS. 19A and 19B are plan perspective views of the drive mechanism for the slide-out extension mechanism shown in FIG. 18.
Figure 19B:
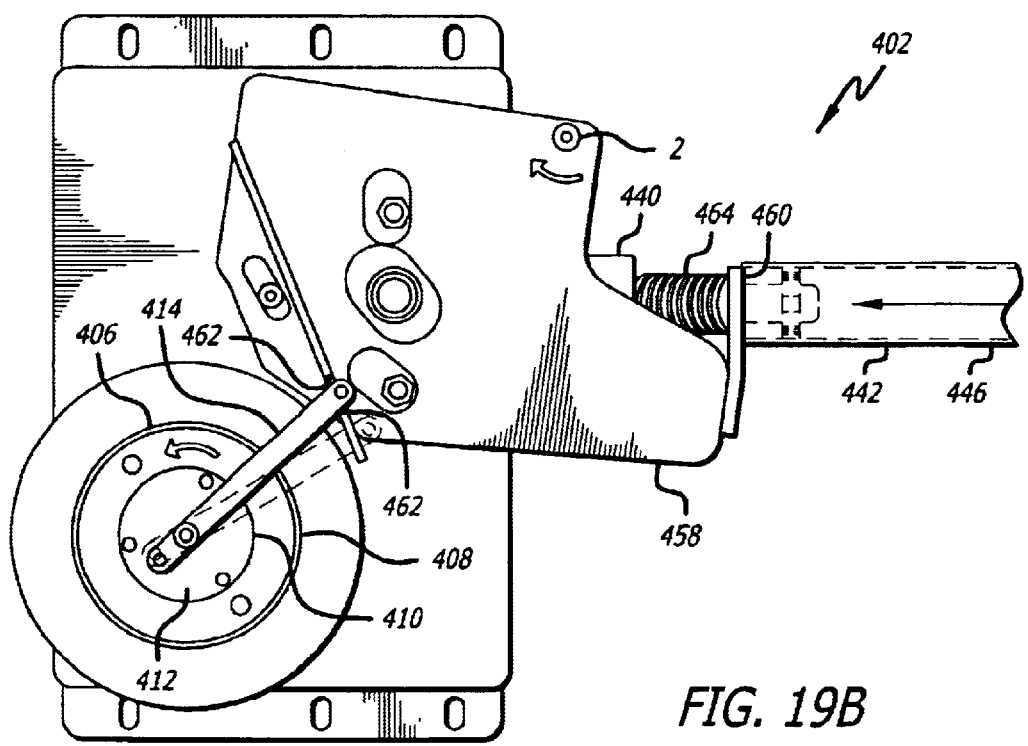
Figure 20A:
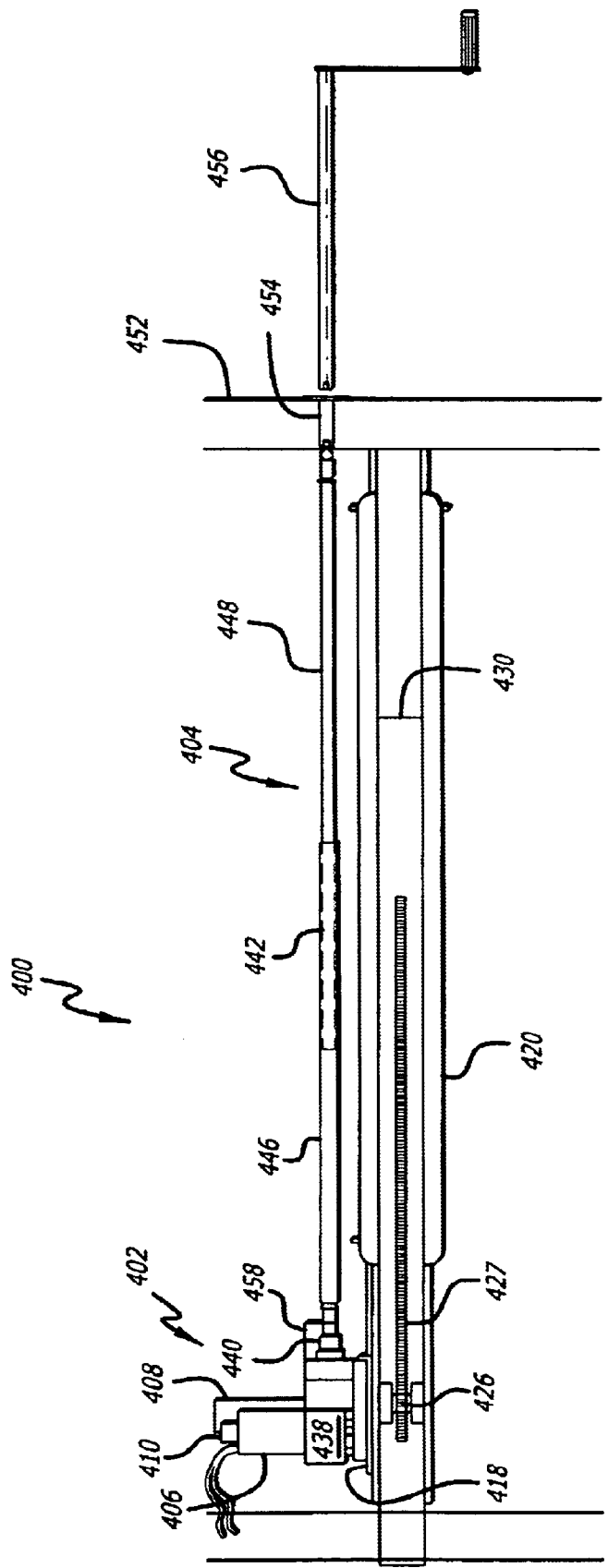
FIGS. 20A–20C are plan views of the manual override system shown in FIG. 18.
Figure 20B:
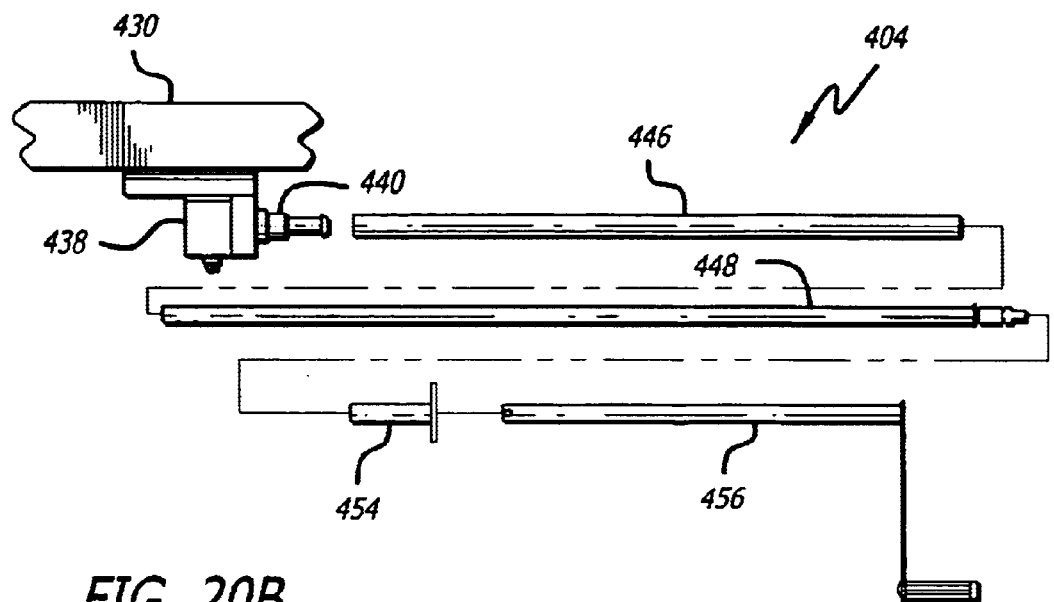
Figure 20C:
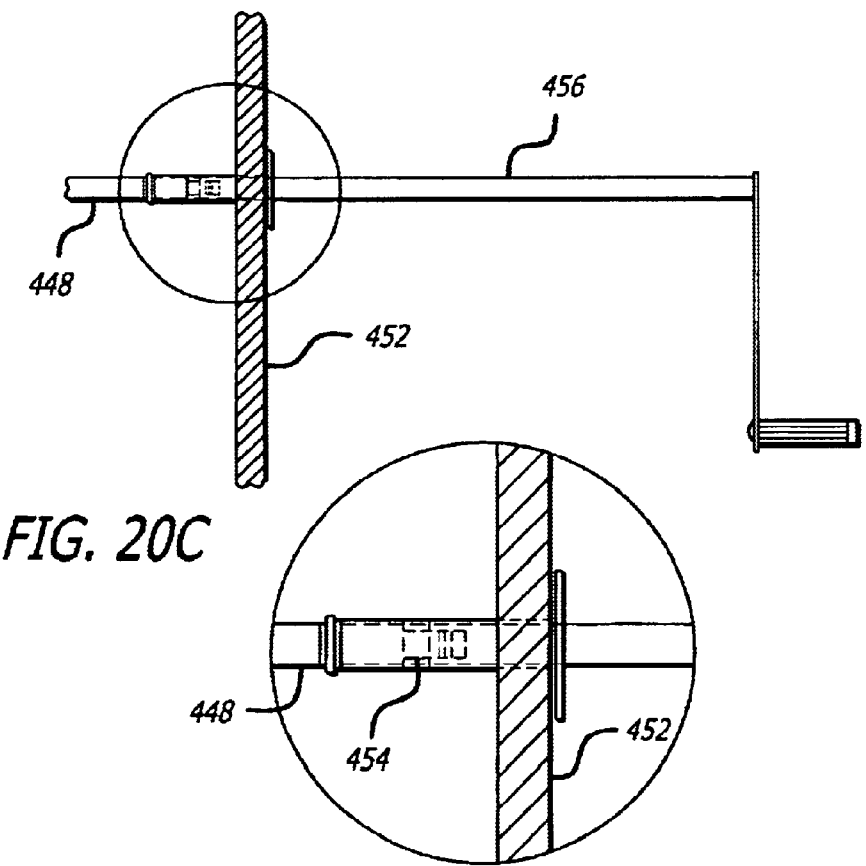
Figure 21:
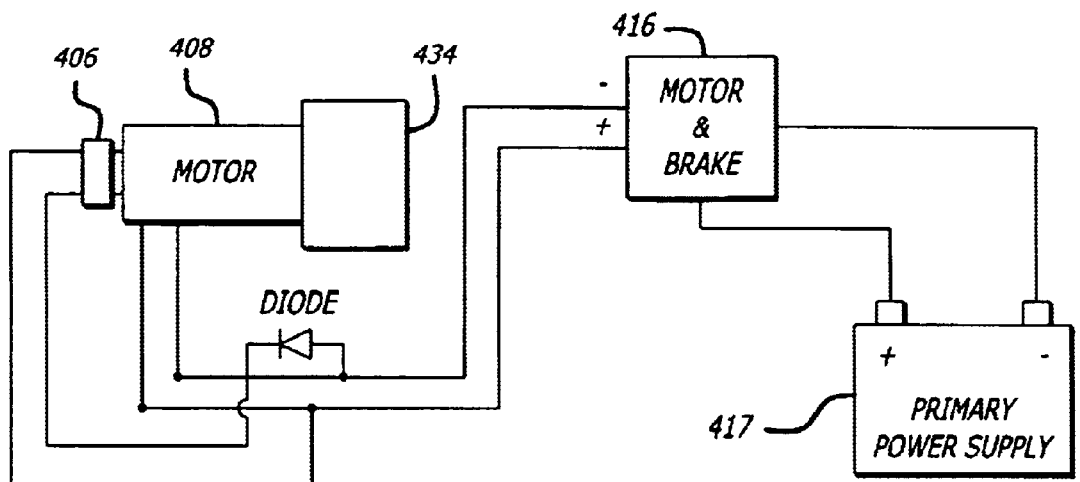
FIG. 21 is a circuit diagram for the slide-out extension mechanism shown in FIG. 18.

Referring to FIGS. 16A, 16B, and 17, another embodiment of a slide-out room 350 according to the present invention is shown which is similar to the prior embodiment and further includes storage compartments 352. Those elements considered unique are discussed in detail, and similar elements are numbered with the same number and with a prime. The storage compartment 352 includes five walls 354 and a front panel 356 hingedly attached to allow access to an interior portion 358. The storage compartment 352 is located underneath a floor section 230' of the slide-out room with the panel flush with the exterior surface of a third sidewall section 236' of the slide-out room 350. By providing such an arrangement, the storage compartment 352 is readily accessible when the slide-out room 350 is in the extended position. One of the problems with existing storage compartments is that they are directly attached to the fixed portion of the vehicle and access to the storage compartment is limited when the slide-out mechanism is extended. With such storage compartments, an operator must either fully retract the slide-out room to access the storage compartment or crawl underneath the extended slide-out room.

Referring back to FIGS. 16A–16B and 17, the slide-out room 350 includes the floor section 230', a first sidewall section 232', a second sidewall section 234', the third sidewall section 236', and a roof section 238'. In the fully retracted position, the roof section 238' and the first 232' and second sidewall section 234' of the slide-out room 350 are typically concealed from exterior view. The third sidewall section 236' of the slide-out room 350 and the front panel 356 of the storage compartment 352 form a portion of the sidewall of the trailer. A slide-out extension mechanism 210' includes a pair of support rails 242' slideably carried in a pair of channels 244' for longitudinal translation therethrough. The pair of channels 244' are spaced apart along the length of a fixed room 202' and are aligned such that their length in the longitudinal direction is along the line of expansion and retraction of the slide-out room 350. The channels 244' are connected to the fixed room 202', and the support rails 242' are connected to the slide-out room 202'. The distal end of the support rail 242' is attached to the distal portion of the slide-out room 350' by a pivot member 254' and a slot member 256'. The pivot member 254' is lengthened to accommodate the storage compartment 352, wherein the storage compartment 352 is directly attached to the pivot member 254'. In the exemplary embodiment, the pivot member 254' is about 17.5 inches in length. The slide-out extension mechanism 210' is configured such that the longitudinal axis of the pivot member 254' remains substantially horizontal when in a fully retracted position, fully extended position, and any intermediate position. By maintaining the pivot member 254' in a substantially horizontal position, the storage compartment 352 similarly remains substantially horizontal during the retraction/extension process. As a result, disturbance of the stored items is kept to a minimum, and the stored items are less likely to fall out of the storage compartment 352 while opening the storage compartment 352.

Operation of the slide-out room 350 is similar to the prior embodiment with the exception that the storage compartment 352 extends/retracts with the extension/retraction of the slide-out room 350. In the event that the primary power supply 294 is incapable of delivering sufficient power to drive the electric motor 292, the manual override system 316 may be used to retract/extend the slide-out room 350.

Referring to FIGS. 18–21, another embodiment of a slide-out extension mechanism 400 having a drive mechanism 402 and a manual override system 404 in accordance with the present invention is illustrated. The drive mechanism 402 includes an integral motor/brake 406 having an electric motor 408 and an external brake 410. The electric motor 408 may be any motor such as the previously identified model manufactured by Von Weise, and the external brake 410 is an electrically controlled, spring-biased brake. As contrasted with the external brake 293 illustrated in FIG. 14, the external brake 410 in this embodiment has a manually releasable brake mechanism 412. That is, the mechanism 412 includes a lever 414 which is rotatably mounted on the end of the electric motor 408 so that movement of the lever 414 in the direction of the arrow (from a locked position to a release position) releases the external brake 410 and allows free rotation of an output shaft of the electric motor 408. Under normal operating conditions, the electric motor 408 and external brake 410 are activated by a motor/brake switch 416 which is preferably located in the interior portion of the trailer 200, but it may be located in any readily accessible location such as an exterior portion of the fixed room 202 near the respective slide-out room 204. Furthermore, the brake/motor switch 416 may be remotely activated by radio transmission if desired. The brake/motor switch 416 is coupled to a primary power supply 417.

The drive mechanism 400 further includes a first housing 418 mounted to a channel 420, and a second housing 422 mounted to another channel 424. A first drive gear 426 is rotatively mounted to the first housing 418, and a second drive gear 428 is rotatively mounted to the second housing 422. Each of the drive gears 426, 428 is in meshing engagement with its respective gear track 429, 431 such that rotation of the drive gears 426, 428 causes support rails 430, 432 to slide in-and-out of their respective channels 420, 424. The drive gears 426, 428 are driven by the electric motor 408, and the electric motor 408 is mounted to the first housing 418. The output shaft of the electric motor 408 is connected to a gear reducing assembly 434, and the gear reducing assembly 434 is coupled to the first drive gear 426. The second drive gear 428 is coupled to the first drive gear 426 by a drive shaft 436 wherein rotation of the first drive gear 426 causes the second drive gear 428 to similarly rotate.

The manual override system 404 may be used to extend and retract the slide-out room 204 in the event that the electric motor 408 is inoperable. The manual override system 404 includes a right angle gear box 438 mounted to the gear reducing assembly 434. The right angle gear box 438 provides an enclosure for a gear system having a bevel gear (not shown) mounted for rotation with the gear reducing assembly 434 and is in meshing engagement with a bevel pinion 440. A first end of a crankshaft 442 is slidingly connected to the bevel pinion 440. The crankshaft 442 includes a central square tube 446 and a telescoping section 448. The telescoping section 448 has a square cross section portion slidably received within a passage defined by the central square tube 446, and the crankshaft 442 extends generally perpendicularly with the drive shaft 436. A second end of the crankshaft 442 passes through an aperture 450 of a first transverse structural member 452 and is received within a lead-in tube 454 mounted to the first transverse structural member 452. The lead-in tube 454 is located at a readily accessible location so that an operator may easily insert and rotate a removable crank handle 456 to manually retract/extend the slide-out room 204. The crank handle 456 is engageable with the second end of the crankshaft 442, wherein rotation of the crank handle 456 rotates the bevel pinion 440, which in turn rotates the gear system of the right angle gear box 438, rotates the gears in the gear reducing assembly 434 and rotates the drive gear 426, 428 in order to manually extend or retract the slide-out room 204.

Before manual rotation of the crank handle 456 can be accomplished, the operator should manually release the external brake 410. In an effort to eliminate the necessity for an operator to directly access and rotate the lever 414 to the release position, a link member 458 is provided so that the lever 414 is rotated to the release position when the crank handle 456 engages with the crankshaft 442. The link member 458 is pivotally connected at point a to the right angle gear box 438 and is movable between a locking position and an unlocking position. When the crank handle 456 engages the crankshaft 442, the crankshaft 442 slides towards the link member 458 and the first end of crankshaft 442 abuts a first contact surface 460 of the link member 458 and causes the link member 458 to pivot to the unlocking position. As the link member 458 pivots towards the unlocking position, a second contact surface 462 of the link member 458 engages the lever 458 and causes the lever 414 to rotate to the release position. Since the link member 458 is biased in the locking position by a bias member 464 such as a spring, the link member 458 pivots back to the locking position when the crank handle 456 is disengaged from the crankshaft 442, the lever 414 returns to the locked position, and the external brake 410 is locked.

It is noted that present invention is not limited to the exemplary embodiment described above and that various adaptations and modifications of the present embodiment may be accomplished without departing from the spirit and scope of the invention. For instance, the lever may be remotely actuated by a separate mechanism which is not coupled to the crankshaft. A shaft may be slidably coupled to a link member such that the operator may release the external brake by pushing the shaft towards the right angle gear box wherein an end adjacent to the link member abuts the first contact surface of the link member. As the link member rotates towards the unlocking position, the second surface of the link member engages and rotates the lever to the release position.

In the event that the electric motor 408 is inoperable, the manual override system 404 may be used to retract or extend the slide-out room 204 in the following manner. If the slide-out room 204 is in the fully retracted position and the operator wishes to fully extend the slide-out room 204, the external brake 410 is released by inserting the crank handle 456 into the lead-in tube 454. The crankshaft 442 is slidingly driven towards the link member 458, and the first end of the crankshaft 442 abuts the first contact surface 460 of the link member 458 and causes the link member 458 to pivot to the unlocking position. As the link member 458 pivots towards the unlocking position, the second contact surface 462 of the link member 458 engages the lever 414 and rotates the lever 414 to the release position. With the external brake 410 released, the crank handle 456 is rotated until the slide-out room 204 is fully extended. After the slide-out room 204 is fully extended, the crank handle 456 is disengaged from the crankshaft 442, the link member 458 pivots to the locking position, the lever 414 is rotated to the locked position, and the external brake 410 is locked.

Figure 24A:
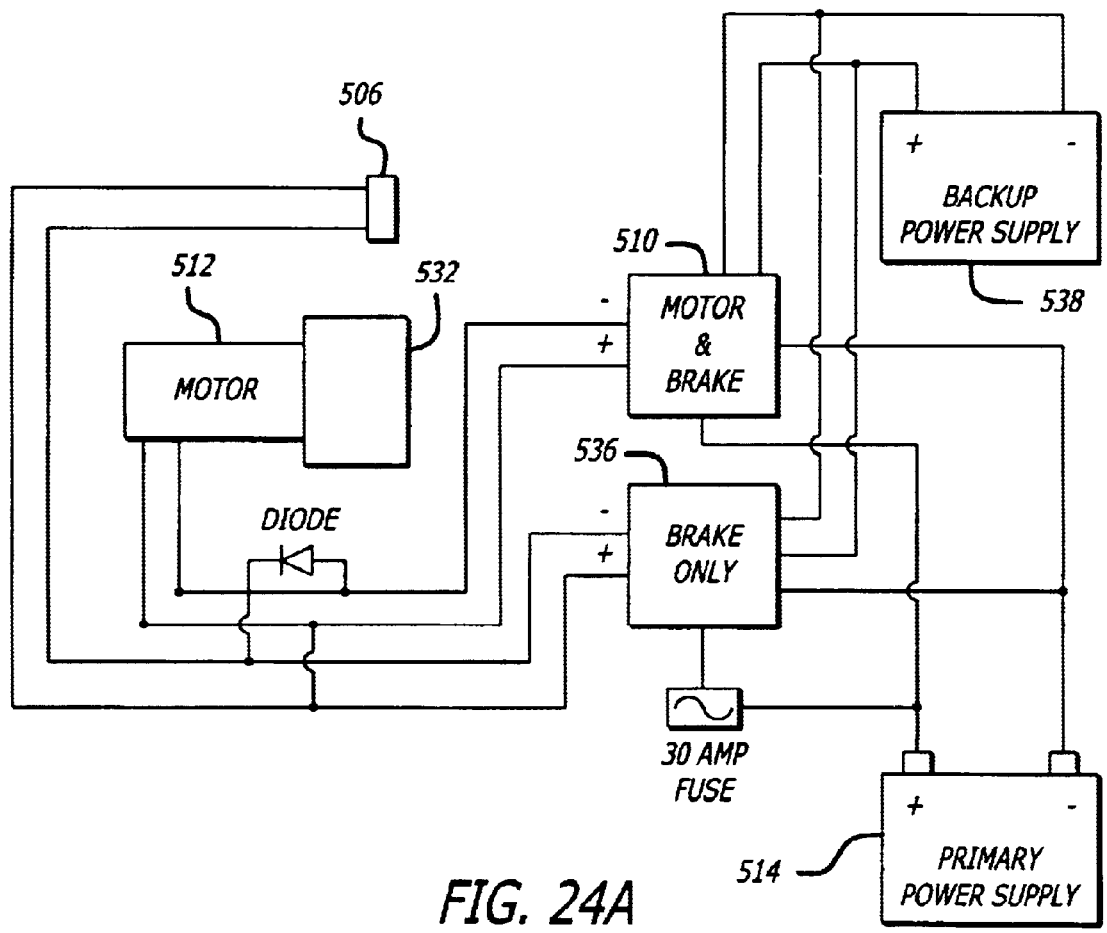
FIG. 24A is a circuit diagram for the slide-out extension mechanism shown in FIG. 22.
Figure 22:
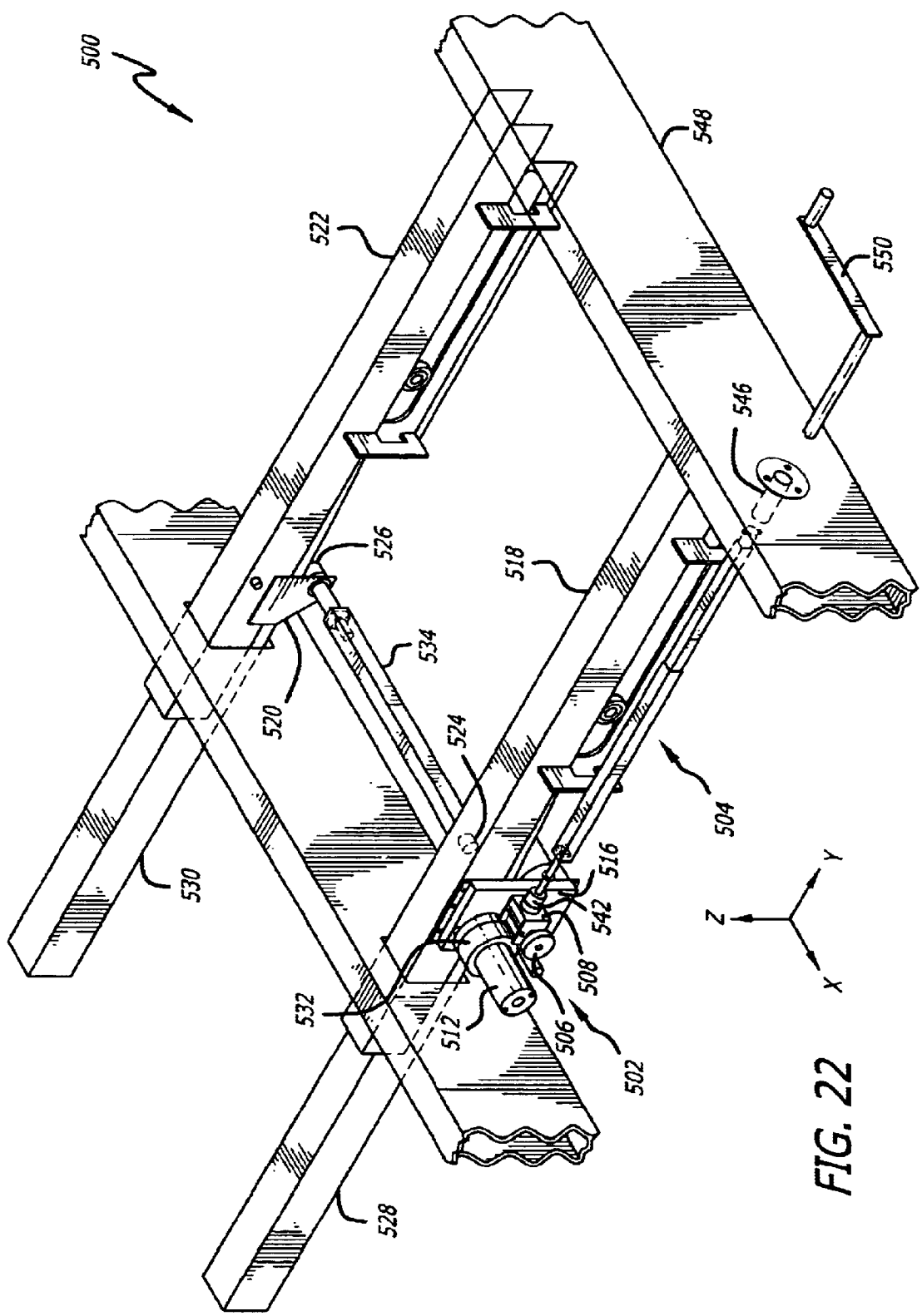
FIG. 22 is a perspective view of another embodiment of a slide-out extension mechanism having a drive mechanism and a manual override system in accordance with the present invention.
Figure 23:
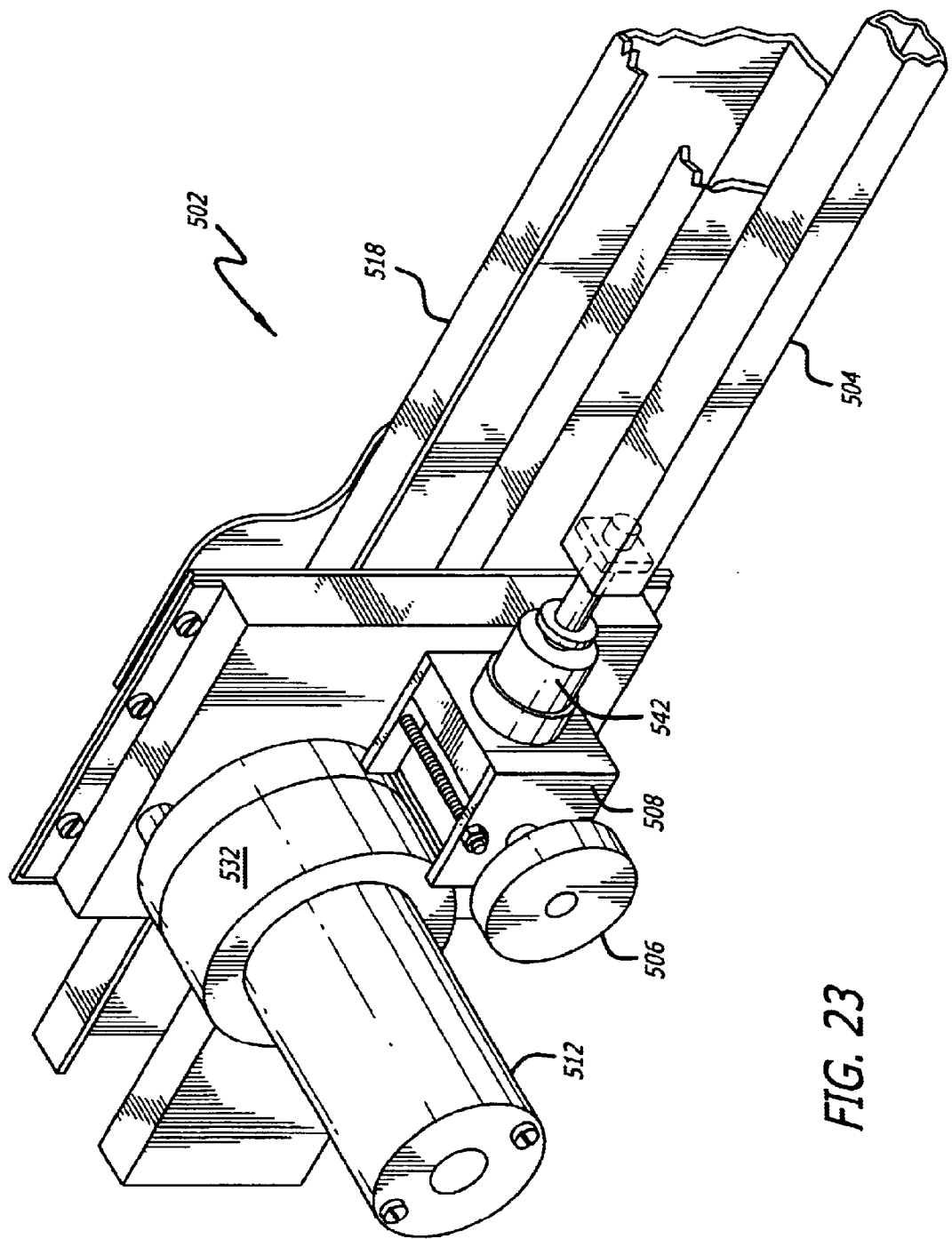
FIG. 23 is an enlarged view of the drive mechanism for the slide-out extension mechanism shown in FIG. 22.
Figure 24B:
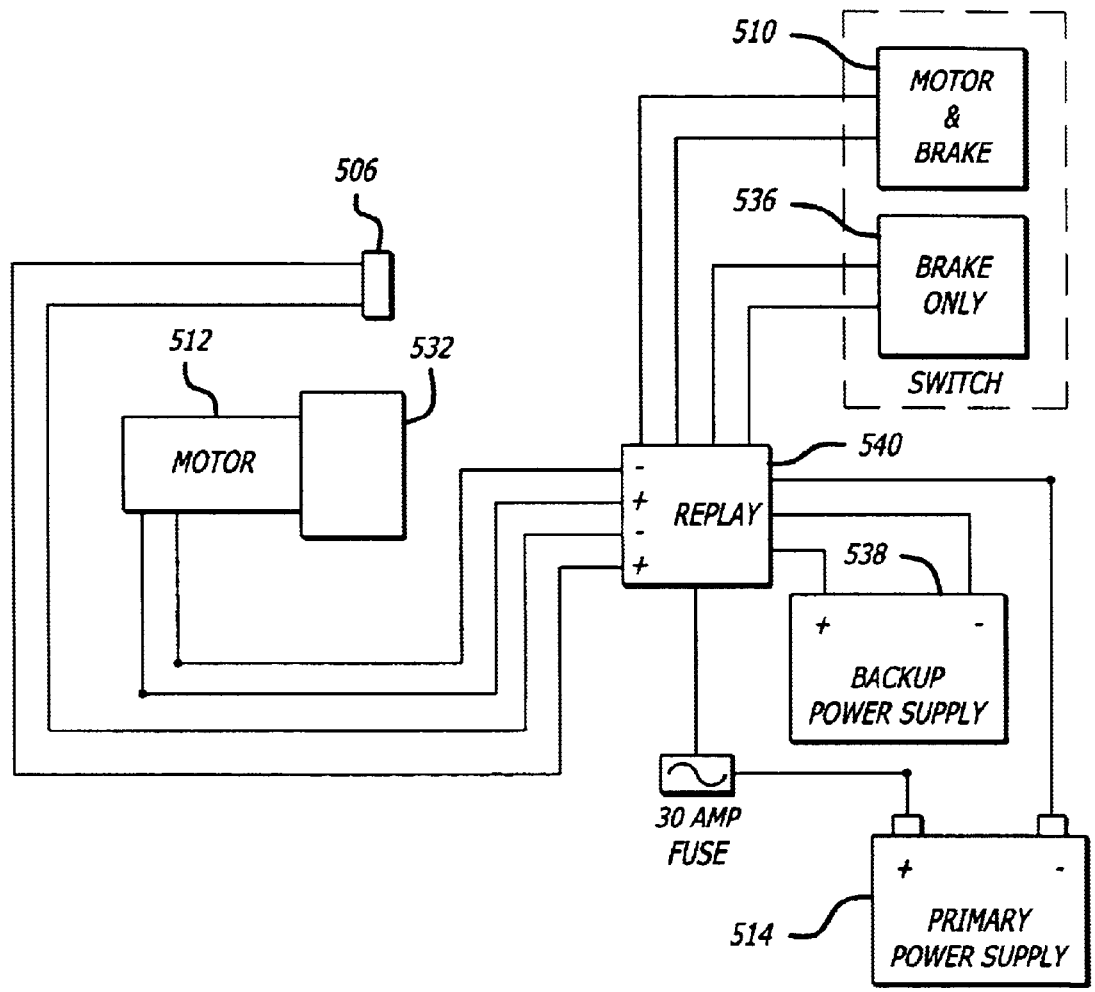
FIG. 24B is an alternative circuit diagram for the slide-out extension mechanism shown in FIG. 22.

Referring to FIGS. 22–24, another embodiment of a slide-out extension mechanism 500 having a drive mechanism 502 and a manual override system 504 in accordance with the present invention is illustrated. As contrasted with the drive mechanism 256 of FIG. 14, the drive mechanism 500 in this embodiment has an external brake 506 mounted on a right angle gear box 508. That is, braking action is performed by the external brake 506 automatically and positively clamping a shaft of the right angle gear box 508 instead of an output shaft of an electric motor when electrical power to the electric motor and external brake is terminated.

The slide-out room 204 is usually automatically extended and retracted by activation of a motor/brake switch 510 which is coupled to an electric motor 512, the external brake 506, and a primary power supply 514. The drive mechanism 502 includes a first housing 516 mounted to a channel and a second housing 520 mounted to another channel 522. A first drive gear 524 is rotatively mounted to the first housing 516, and a second drive gear 526 is rotatively mounted to the second housing 520. Each of the drive gears 524, 526 is in meshing engagement with its respective gear track such that rotation of the drive gears 524, 526 causes support rails 528, 530 to slide in-and-out of their respective channels 518, 522. The drive gears 524, 526 are driven by the electric motor 512, and the electric motor 512 is mounted to the first housing 516. The output shaft of the electric motor 512 is connected to a gear reducing assembly 532, and the gear reducing assembly 532 is coupled to the first drive gear 524. The second drive gear 526 is coupled to the first drive gear 524 by a drive shaft 534 wherein rotation of the first drive gear 524 causes the second drive gear 526 to similarly rotate.

In the event the electric motor 512 is inoperable, the slide-out room 204 may still be operated by the manual override system 504. Since the external brake 506 is in the locked position when in the deactivated mode, a brake-only switch 536 is provided to activate the external brake 506 into the release mode. The brake-only switch 536 is coupled to the primary power supply 514. However, if the primary power supply 514 is dead or insufficiently charged to activate the external brake 506, a backup power supply 538 is coupled to the brake-only switch 536 to provide sufficient power to activate the external brake 506. Furthermore, a relay 540 may be provided to couple the electric motor 512 and external brake 506 to the motor/brake switch 510, brake-only switch, primary power supply 514, and backup power supply 538.

As best shown in FIGS. 22 and 23, the right angle gear box 508 is mounted to the gear reducing assembly 532 and provides an enclosure for a gear system mounted for rotation with the gear reducing assembly 532. The right angle gear box 508 is in meshing engagement with a bevel pinion 542, and the bevel pinion 542 is secured to a first end of a crankshaft 544. A second end of the crankshaft 544 is received within a lead-in-tube 546 mounted to a first transverse structural member 548. The lead-in tube 546 is positioned at a readily accessible location so that an operator may easily insert a removable crank handle 550 to manually retract/extend the slide-out room 204. The crank handle 550 is engageable with the second end of the crankshaft 544. Rotation of the crank handle 550 rotates the bevel pinion 542, which in turn rotates the gear system of the right angle gear box 508, rotates the gears in the gear reducing assembly 532, and rotates the drive gears 524, 526 in order to manually extend or retract the slide-out room 204.

The slide-out room 204 is operated in the following manner. With the slide-out room 204 in the fully retracted position, the operator sets the motor/brake switch 510 to the "on" position. The electric motor 512 and external brake 506 are energized, and the support rails 528, 530 extend outwardly from the channels 518, 522. At the fully extended position, the motor/brake switch 510 is automatically reset to the "off" position, the electric motor 512 is automatically deactivated, and the external brake 506 is engaged to positively lock the slide-out room 204 in the fully extended position. The slide-out room 204 may be moved from the fully extended position to the fully retracted position by setting the motor/brake switch 510 to the "on" position. The electric motor 512 and external brake 506 are energized, and the support rails 528, 530 retract inwardly into the channels 518, 522 at the same speed. At the fully retracted position, the motor/brake switch 510 is automatically set to the "off" position, the electric motor 512 and the external brake 506 are de-energized, and the slide-out room 204 is positively locked by the external brake 506. It is noted that the slide-out room 204 may be partially extended or retracted by manually setting the motor/brake switch 510 to the "off" position during the extension/retraction of the slide-out room 204.

In the event that the electric motor 512 is inoperable such as when the primary power supply 514 is incapable of delivering sufficient power to drive the electric motor 512, the manual override system 504 may be used to retract or extend the slide-out room 204. Before manual rotation of the drive shaft 534 can be accomplished, the operator releases the external brake 506 by setting the brake-only switch 536 to the "on" position. The backup power supply 538 may be used when the primary power supply 514 is insufficiently charged to energize the external brake 506. If the slide-out room 204 is in the fully retracted position and the operator wishes to fully extend the slide-out room 204, the operator may insert the crank handle 550 into the lead-in tube 546 and rotate the crank handle 550 until the slide-out room 204 is fully extended. After the slide-out room 204 is fully extended, the brake-only switch 536 is repositioned to the "off" position, and the external brake 506 positively locks the slide-out room 204. Similarly, the slide-out room 204 may be manually retracted from the fully extended position or any intermediate position by setting the brake-only switch 536 to the "on" position to release the external brake 506, inserting the crank handle 550 into the lead-in tube 546, and rotating the crank handle 550 until the slide-out room 204 is fully retracted. After the slide-out room 204 is fully retracted, the brake-only switch 536 is set to the "off" position, and the external brake 506 positively locks the slide-out room 204.

Figure 25:
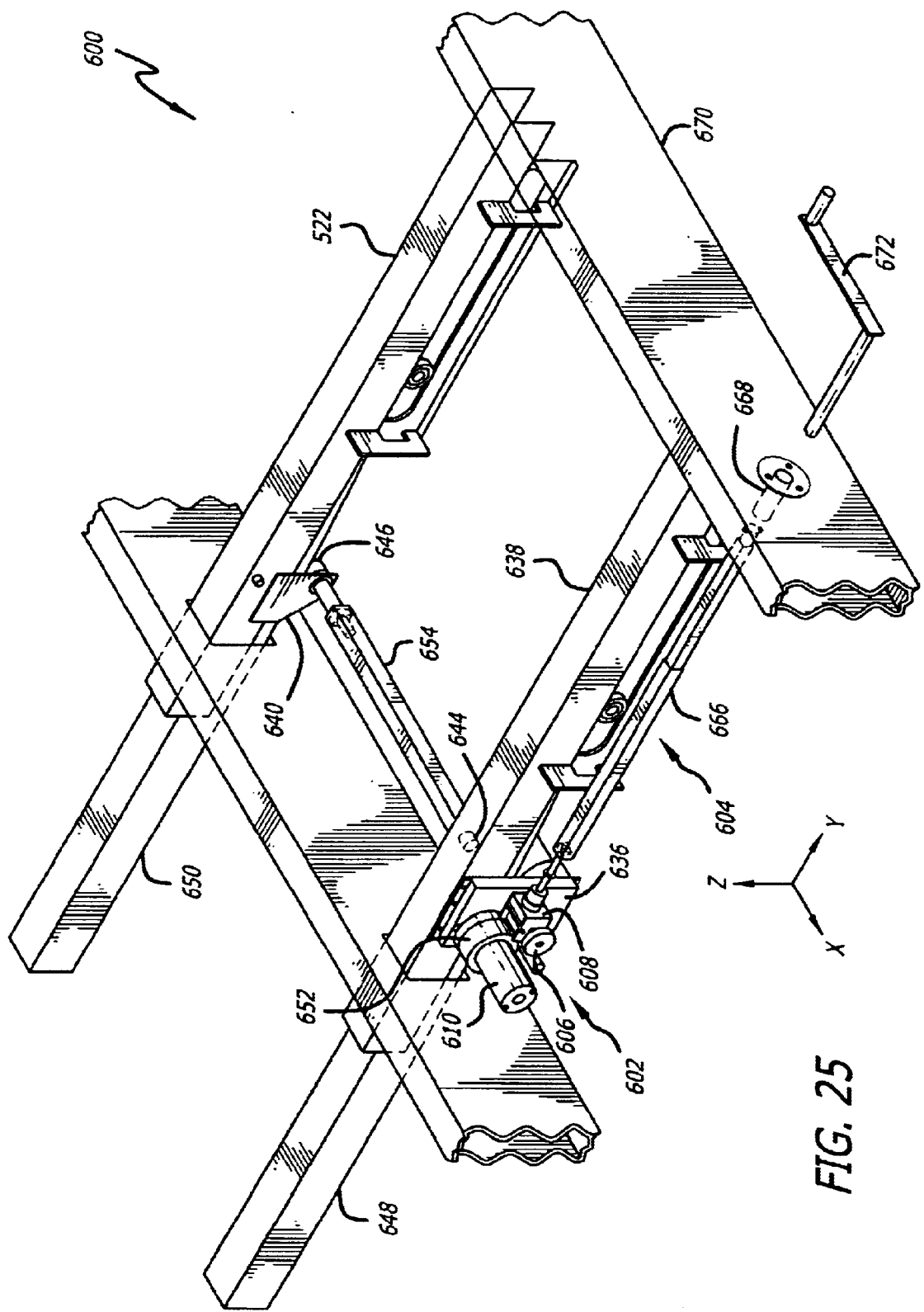
FIG. 25 is a perspective view of another embodiment of a slide-out extension mechanism having a drive mechanism and a manual override system in accordance with the present invention.

Referring to FIGS. 25–27, another embodiment of a slide-out extension mechanism 600 having a drive mechanism 602 and a manual override system 604 in accordance with the present invention is illustrated. As contrasted with the drive mechanism 256 of FIG. 14, the drive mechanism 602 in this embodiment has a pawl brake 606 mounted on a right angle gear box 608, wherein braking is performed by the pawl brake 606 positively locking a shaft of the right angle gear box 608 when electrical power to an electric motor 610 and pawl brake 606 is terminated. Under normal operating conditions, the electric motor 610 and pawl brake 606 are activated by a motor/brake switch 607 which is preferably located in the interior portion of the trailer 200, but it may be located in any readily accessible location such as an exterior portion of the fixed room 200.

As best shown in FIGS. 26A–26D, the pawl brake 606 includes a rotatable disk 614 which is connected to a shaft of the right angle gear box 608, and a plurality of apertures 616 are located circumferentially near an outer portion of the disk 614. A first rocker arm 618 and a second rocker arm 620 are pivotally coupled to the right angle gear box 608, wherein the rocker arms 618, 620 are parallel to each other. Each rocker arm 618, 620 includes a latching member 622, 624 which engages with the plurality of apertures 616 of the disk 614. The first latching member 622 includes a locking surface 626 which prevents clockwise rotation of the disk 614 when engaged with the one of the apertures 616, and the second latching member 624 includes a locking surface 628 which prevents counterclockwise rotation of the disk 614 when engaged with one of the other apertures 616. Thus, both clockwise and counterclockwise rotation of the disk 614 may be prevented when both rocker arms 618, 620 engage with the apertures 616 of the disk 614. An actuator, which is mounted to the right angle gear box 608, causes the first 618 and second rocker arm 620 to simultaneously engage (see FIG. 26A) and disengage (see FIG. 26B) with the disk 614. In the exemplary embodiment, the actuator is a solenoid 630 having a pin 632. The pin 632 is coupled to the first 618 and second rocker arm 620 by a cross member 634, and the pin 632 is extended when the solenoid 630 is de-energized and retracted when the solenoid 630 is energized. The actuator may be any electronic solenoid, as shown in the drawings, or other device known in the art for selectively moving a pin or other element to and from and extended and retracted position.

Referring back to FIG. 25, the drive mechanism 602 further includes a first housing 636 mounted to one channel 638 and a second housing 640 mounted to another channel 642. A first drive gear 644 is rotatively mounted to the first housing 636, and a second drive gear 646 is rotatively mounted to the second housing 640. Each of the drive gears 644, 646 is in meshing engagement with its respective gear track such that rotation of the drive gears 640, 646 cause support rails 648, 650 to slide in-and-out of their respective channels 638, 642. The drive gears 644, 646 are driven by the electric motor 610, and the electric motor 610 is mounted to the first housing 636. The output shaft of the electric motor 610 is connected to a gear reducing assembly 652, and the gear reducing assembly 652 is coupled to the first drive gear 644. The second drive gear 646 is coupled to the first drive gear 644 by a drive shaft 654 wherein rotation of the first drive gear 644 causes the second drive gear 646 to similarly rotate.

In the event the electric motor 610 is inoperable, the slide-out room 204 may still be operated by the manual override system 604. Since the pawl brake 606 is in the locked position when in the deactivated mode, a brake-only switch 656 is provided to activate the pawl brake 606 into the release mode. The brake-only switch 656 is coupled to the electric motor 610, the pawl brake 606, and a primary power supply 658 (see FIG. 27A). However, if the primary power supply 658 is dead or insufficiently charged to activate the pawl brake 606, a backup power supply 660 is coupled to the brake-only switch 656 to provide sufficient power to activate the pawl brake 606. Furthermore, a relay 662 may be provided to couple the electric motor 610 and pawl brake 606 to the motor/brake switch 607, brake-only switch 654, primary power supply 656, and backup power supply 660 (see FIG. 27B).

Referring back to FIG. 25, the right angle gear box 608 is mounted to the gear reducing assembly 652 and provides an enclosure for a gear system mounted for rotation with the gear reducing assembly 652. The right angle gear box 608 is in meshing engagement with a bevel pinion 664, and the bevel pinion 664 is secured to a first end of a crankshaft 666. A second end of the crankshaft 666 is received within a lead-in-tube 668 mounted to a first transverse structural member 670. The lead-in tube 668 is positioned at a readily accessible location so that an operator may easily insert a removable crank handle 672 to manually retract/extend the slide-out room 204. The crank handle 672 is engageable with the second end of the crankshaft 666. Rotation of the crank handle 672 rotates the bevel pinion 664, which in turn rotates the gear system of the right angle gear box 608, rotates the gears in the gear reducing assembly 652, and rotates the drive gears in order to manually extend or retract the slide-out room 204.

Figure 26A:
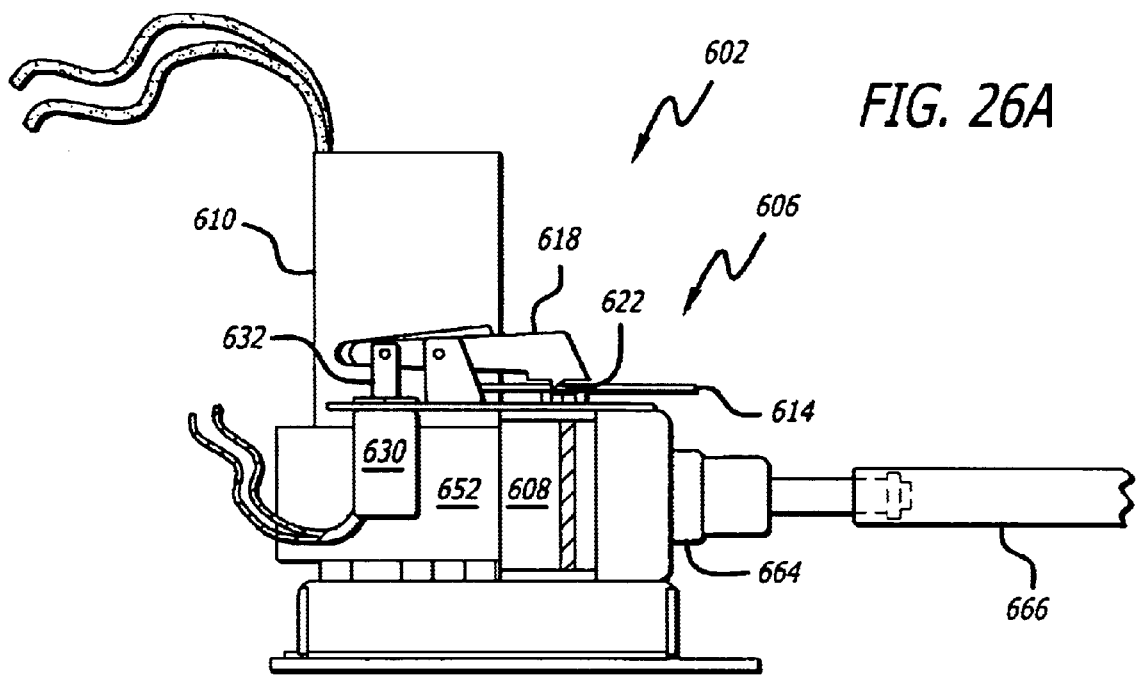
FIGS. 26A–26C are various plan views of the drive mechanism for the slide-out extension mechanism shown in FIG. 25.
Figure 26B:
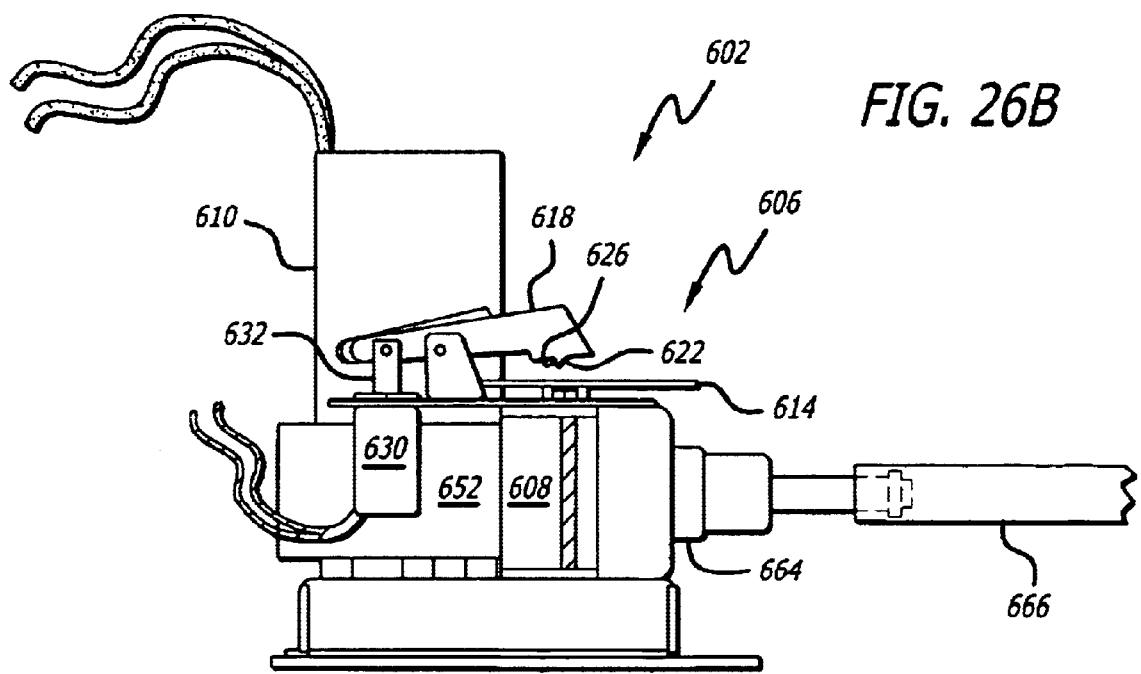
Figure 26C:
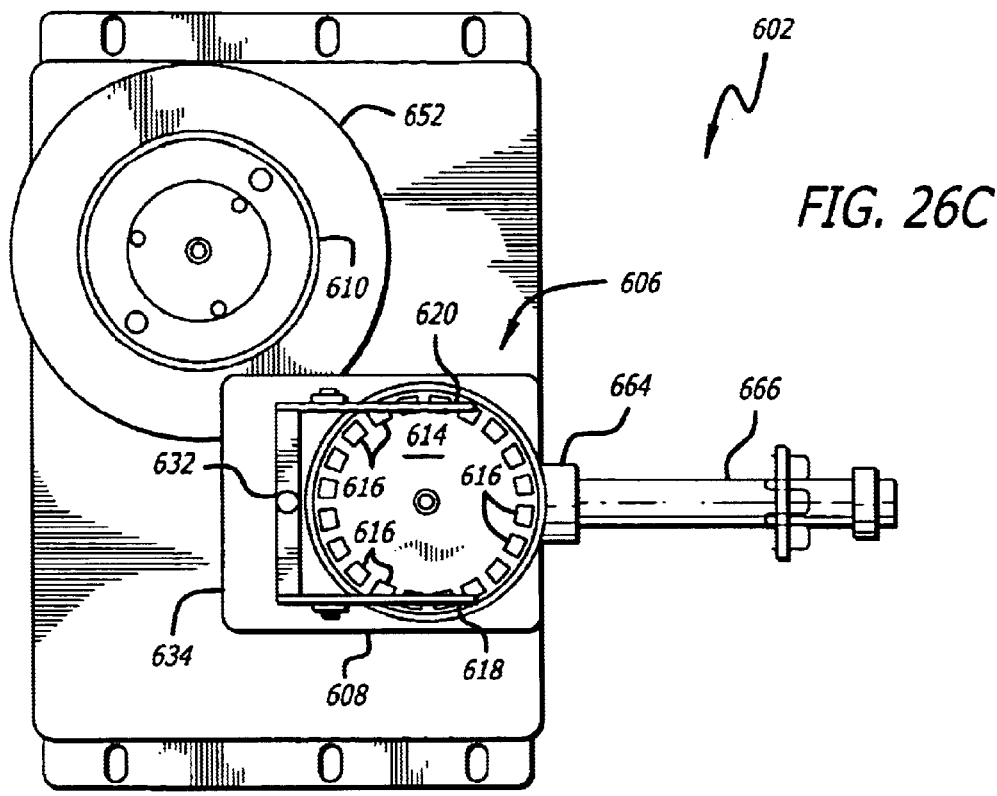
Figure 27A:
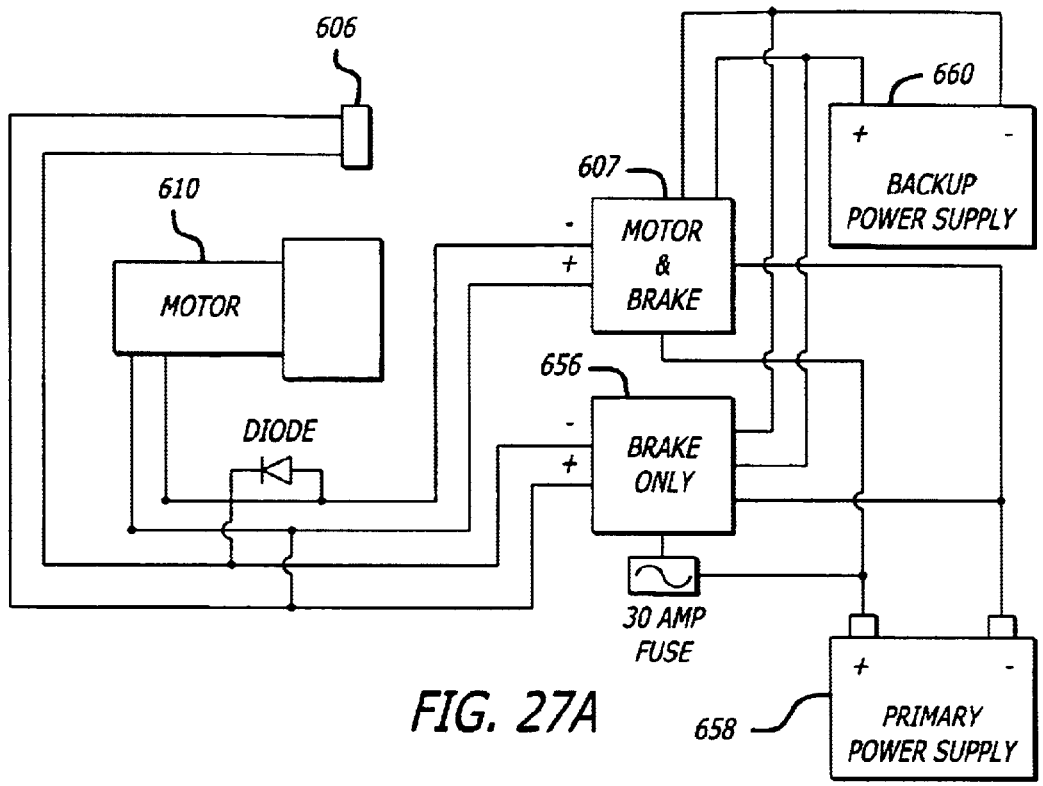
FIG. 27A is a circuit diagram for the slide-out extension mechanism shown in FIG. 25.
Figure 27B:
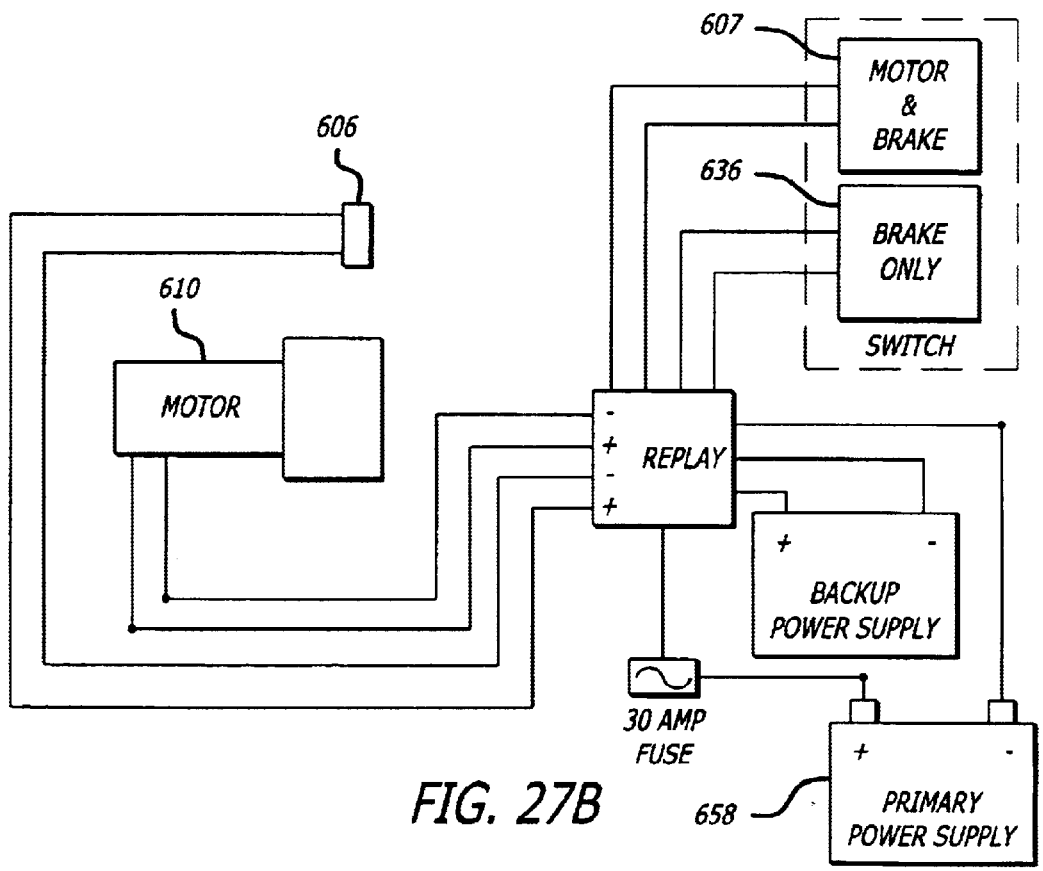
FIG. 27B is an alternative circuit diagram for the slide-out extension mechanism shown in FIG. 25.

The slide-out room 204 is operated in the following manner. As shown in FIG. 26A, the solenoid 630 and electric motor 610 are usually de-energized, the pin 632 is extended, the first 618 and second rocker arm 620 are engaged with the disk 614, and the slide-out room 204 is prevented from retracting or extending. With the slide-out room 204 in the fully retracted position, the operator sets the motor/brake switch 607 to the "on" position. As shown in FIG. 26B, the electric motor 610 and solenoid 630 are energized, the pin 632 is retracted, the first 618 and second rocker arm 620 are disengaged from the disk 616, the support rails 648, 650 extend outwardly from the channels 638, 642, and the slide-out room 204 extends outwardly. At the fully extended position, the motor/brake switch 607 is automatically reset to the "off" position, the electric motor 610 is automatically de-energized, and the pawl brake 606 is engaged to positively lock the slide-out room 204 in the fully extended position. The slide-out room 204 may be moved from the fully extended to the fully retracted position by setting the motor/brake switch 607 to the "on" position. The electric motor 610 and solenoid 630 are energized, the pin 632 is retracted, the first 618 and second rocker arm 620 are disengaged from the disk 614, the support rails 648, 650 retract inwardly into the channels 638, 642, and the slide-out room 204 is retracted. At the fully retracted position, the motor/brake switch 607 is automatically set to the "off" position, the electric motor 610 and solenoid 630 are de-energized, the pin 632 is extended, the first 618 and second rocker 620 are engaged with the disk 614, and the slide-out room 204 is positively locked by the pawl brake 606.

The manual override system 604 may be used to retract or extend the slide-out room 204 when the electric motor 610 is inoperable. Before manual rotation of the drive shaft 654 can be accomplished, the operator releases the pawl brake 606 by setting the brake-only switch 656 to the "on" position. In order to extend the slide-out room 204, the operator may insert the crank handle 672 into the lead-in tube 668 and rotate the crank handle 672 until the slide-out room 204 is fully extended. After the slide-out room 204 is fully extended, the brake-only switch 656 is repositioned to the "off" position, the solenoid 630 is de-energized, the pin 632 is extended, the first 618 and second rocker arm 620 are engaged with the disk 614, and the slide-out room 204 is locked. In order too retract the slide-out room 204, the operator releases the pawl brake 606 by setting the brake-only switch 656 to the "on" position, inserts the crank handle 672 into the lead-in tube 668, and rotates the crank handle 672 until the slide-out room 204 is retracted. After the slide-out room 204 is retracted to the desired position, the brake-only switch 656 is set to the "off" position to positively lock the slide-out room 204.

Figure 29C:
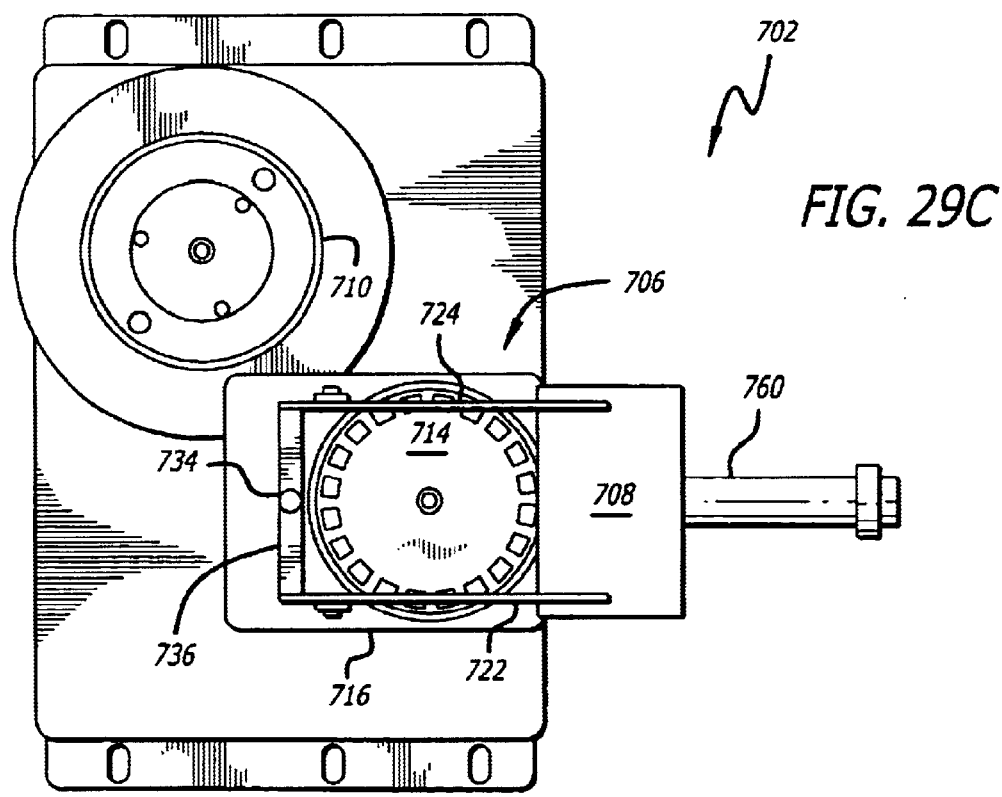
FIGS. 29A–29C are various plan views of the drive mechanism for the slide-out extension mechanism shown in FIG. 28.
Figure 28:
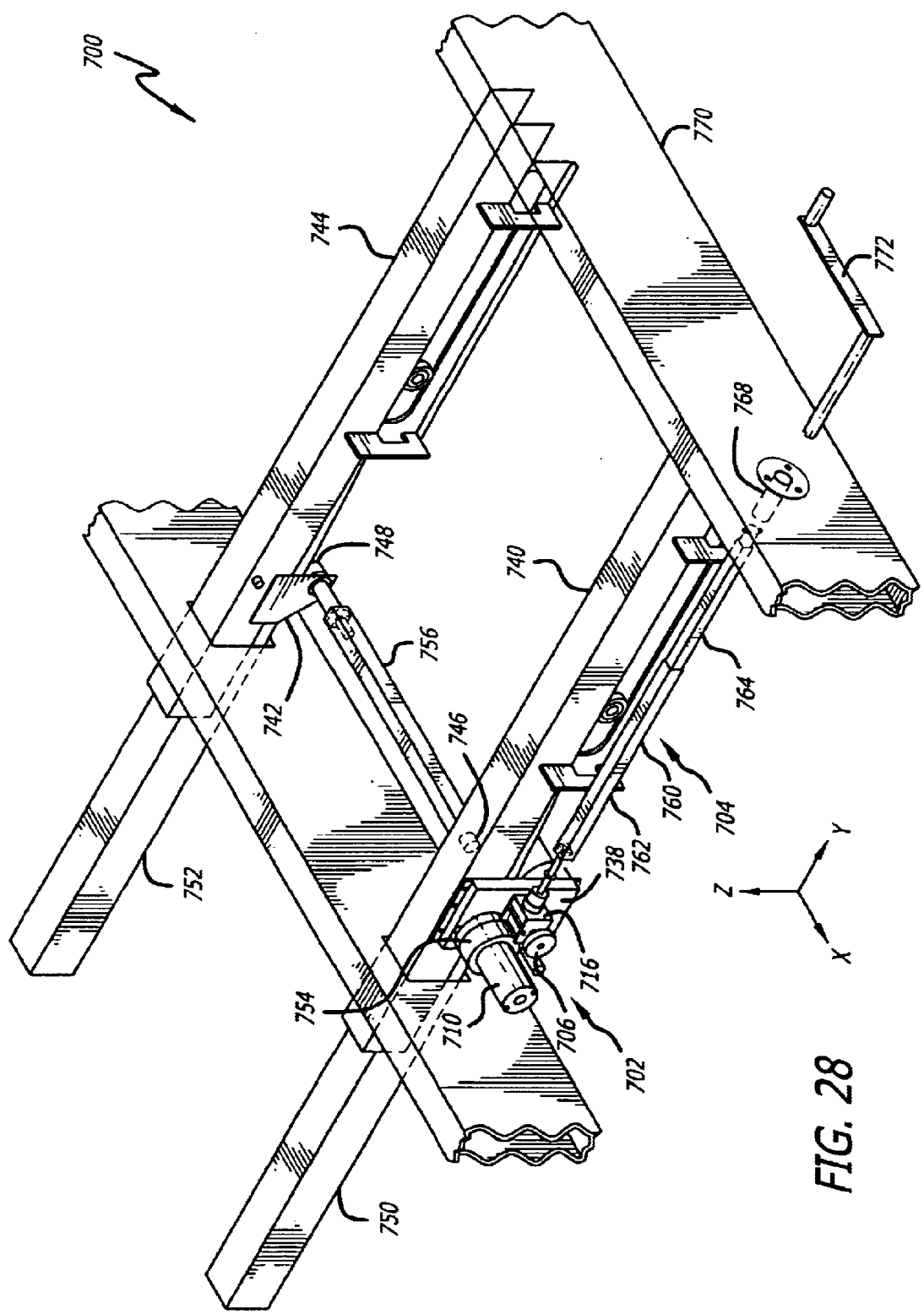
FIG. 28 is a perspective view of still another embodiment of a slide-out extension mechanism having a drive mechanism and a manual override system in accordance with the present invention.
Figure 29A:
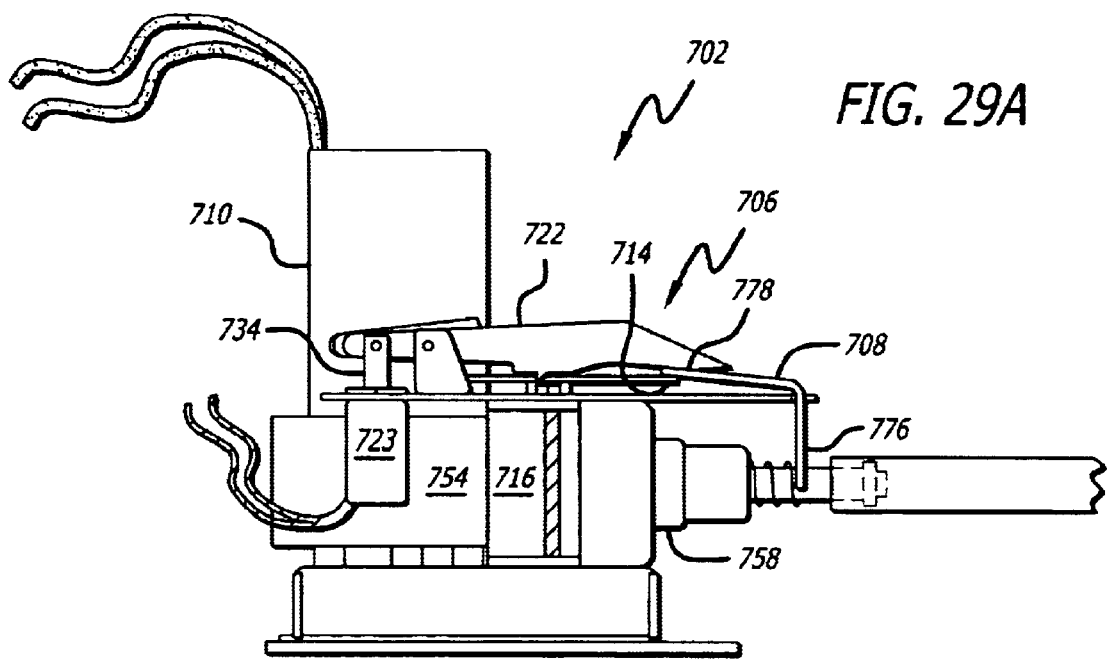
Figure 29B:
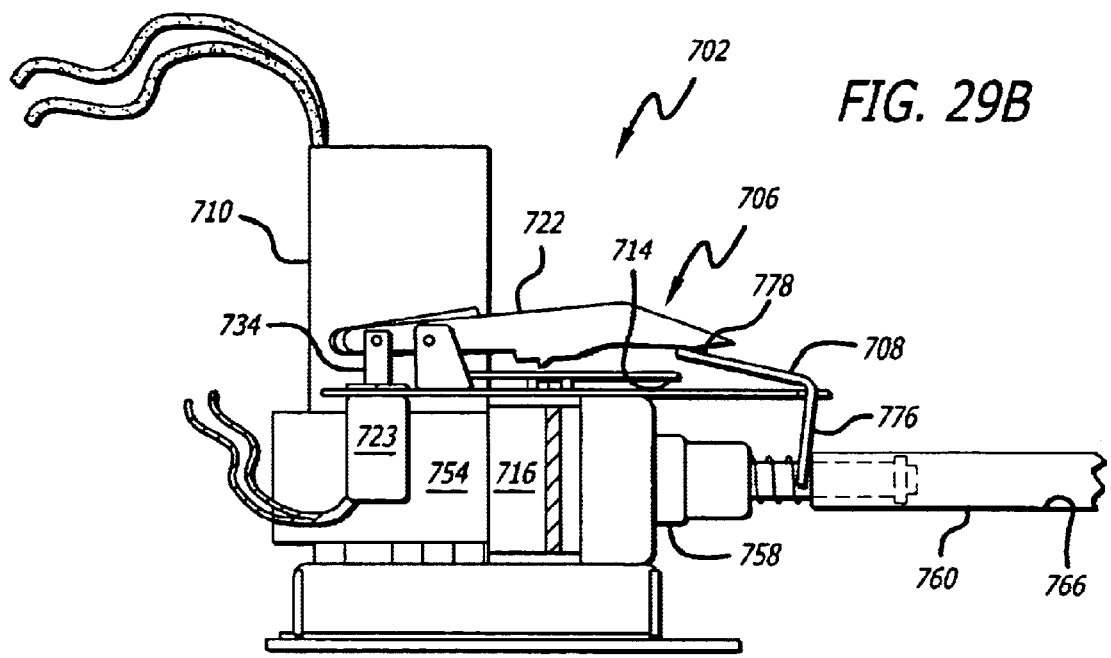
Figure 30:
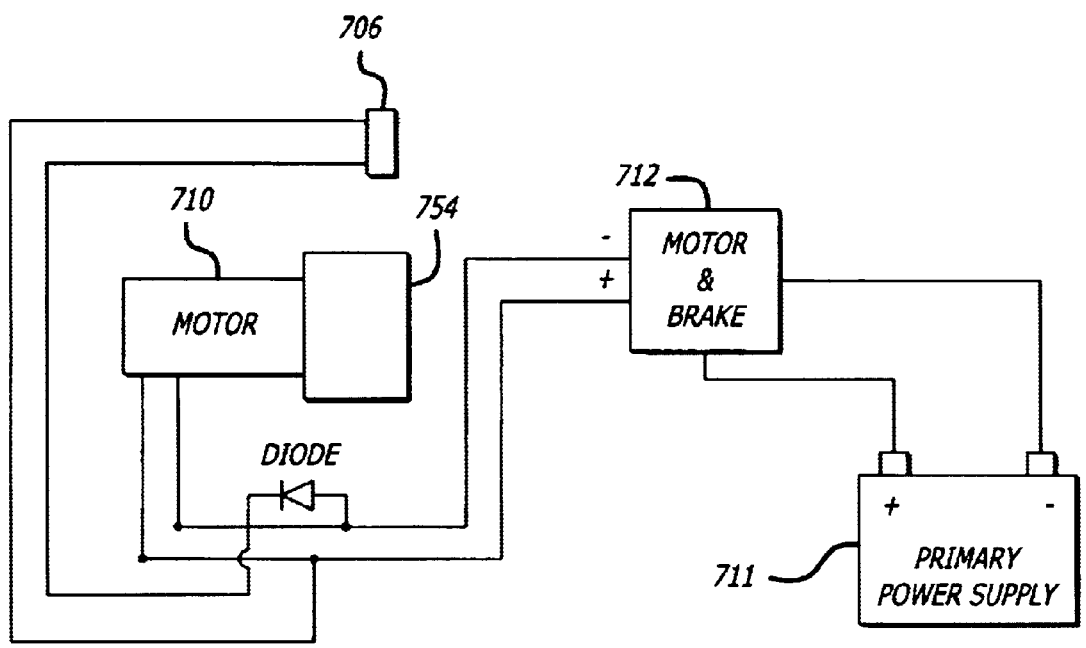
FIG. 30 is a circuit diagram for the slide-out extension mechanism shown in FIG. 28.

Referring to FIGS. 28–30, another embodiment of a slide-out extension mechanism 700 having a drive mechanism 702 and a manual override system 704 in accordance with the present invention is illustrated. As contrasted with the drive mechanism 602 described in FIGS. 25–27, a pawl brake 706 may be mechanically released by an link member 708 in the event that an electric motor 710 is inoperable. Under normal operating conditions, the electric motor 710 and pawl brake 706 are activated by a motor/brake switch 712 which is preferably located in the interior portion of the trailer 200, but it may be located in any readily accessible location such as an exterior portion of the fixed room 202. The motor/brake switch 712 is coupled to a primary power supply 711.

Referring back to FIGS. 29A–29C, the pawl brake 706 includes a rotatable disk 714 which is connected to a shaft of a right angle gear box 716. A plurality of apertures 718 are located circumferentially near an outer portion of the disk 714. A first rocker arm 720 and a second rocker arm 722 are pivotally coupled to the right angle gear box 716, wherein the rocker arms 722, 724 are parallel to each other. Each rocker arm 722, 724 includes a latching member 726, 728 which engages with the plurality of apertures 718. The first latching member 724 includes a locking surface 728 which prevent clockwise rotation of the disk 714 when engaged with one of the apertures 718, and the second latching member 726 includes a locking surface 730 which prevents counterclockwise rotation of the disk 714 when engaged with one of the other apertures 718. Thus, both clockwise and counterclockwise rotation of the disk 714 may be prevented when both rocker arms 720, 722 engage with the apertures 718 of the disk 714. An actuator, which is mounted to the right angle gear box 716, causes the rocker arms 720, 722 to simultaneously engage (see FIG. 29A) and disengage (see FIG. 29B) with the disk 714. In the exemplary embodiment, the actuator is a solenoid 723 having a pin 734. The pin 734 is coupled to the first 720 and second rocker arm 722 by a cross member 736, and the pin 734 is extended when the solenoid 732 is de-energized and retracted when the solenoid 732 is energized. It is noted that the actuator may be any device known in the art for selectively moving a pin or other to and from and extended and retracted position.

Referring back to FIG. 28, the drive mechanism 702 further includes a first housing 738 mounted to one channel 740 and a second housing 742 mounted to another channel. A first drive gear 746 is rotatively mounted to the first housing 738, and a second drive gear 748 is rotatively mounted to the second housing 742. Each of the drive gears 746, 748 is in meshing engagement with its respective gear track such that rotation of the drive gears 746, 748 cause support rails 750, 752 to slide in-and-out of their respective channels 740, 744. The drive gears 746, 748 are driven by the electric motor 710, and the electric motor 710 is mounted to the first housing 730. An output shaft of the electric motor 710 is connected to a gear reducing assembly 754, and the gear reducing assembly 754 is coupled to the first drive gear 746. The second drive gear 748 is coupled to the first drive gear 746 by a drive shaft 756 wherein rotation of the first drive gear 746 causes the second drive gear 748 to similarly rotate.

The manual override system 704 may be used to extend and retract the slide-out room 204 in the event that the electric motor 710 is inoperable. The right angle gear box 716 provides an enclosure for a gear system having a bevel gear (not shown) mounted for rotation with the gear reducing assembly 754. A bevel pinion 758 is in meshing engagement with the gear reducing assembly 754. A first end of a crankshaft 760 is slidingly connected to the bevel pinion 758. The crankshaft 760 includes a central square tube 762 and a telescoping section 764. The telescoping section 764 has a square cross section portion slidably received within a passage 766 defined by the central square tube. A second end of the crankshaft 760 is received within a lead-in tube 768 mounted to a first transverse structural member 770. A removable crank handle 772 engages with the second end of the crankshaft 760 when inserted into the lead-in tube 768.

Rotation of the crank handle 772 rotates the bevel pinion 758, which in turn rotates the gear system of the right angle gear box, rotates the gears in the gear reducing assembly 754 and rotates the first drive gear 746 in order to manually extend or retract the slide-out room 204. A link member 708 is pivotally connected to the right angle gear box 716 and is movable between a locking position and an unlocking position. When the crank handle 776 is inserted into the lead-in tube 768, the crank handle 772 engages the crankshaft 760. The crankshaft 760 slides towards the link member 708, and the first end of the crankshaft 760 abuts a first contact surface 776 of the link member 708. As the link member 708 pivots to the unlocking position, a second contact surface 778 of the link member 708 engages a lever portion 780, 782 of each of the rocker arms 720, 722. The rocker arms 720, 722 pivot to their disengaged position and the slide-out room 204 is free to be retracted or extended. A bias member 784 such as a spring is provided between the bevel pinion 758 and link member 708 to bias the link member 708 in the locking position. Thus, the link member 708 pivots to the locking position and the pawl brake 706 is locked when the crank handle 772 is disengaged from the crankshaft 760.

The slide-out room 204 is operated in the following manner. As shown in FIG. 29A, the electric motor 710 and solenoid 732 are usually de-energized, the pin 734 is extended, the first 720 and second rocker arm 722 are engaged with the disk 714, and the slide-out room 204 is prevented from retracting or extending. With the slide-out room 204 in the fully retracted position, the operator sets the motor/brake switch 712 to the "on" position. As shown in FIG. 29B, the electric motor 710 and solenoid 732 are energized, the pin 734 is retracted, the first 720 and second rocker arm 722 are disengaged from the disk 714, the support rails 750, 752 extend outwardly from the channels 740, 744, and the slide-out room 204 extends outwardly. At the fully extended position, the motor/brake switch 712 is automatically reset to the "off" position, the electric motor 710 is de-energized, and the pawl brake 706 is engaged to positively lock the slide-out room 204 in the fully extended position. The slide-out room 204 may be moved from the fully extended position to the fully retracted position by setting the motor/brake switch 712 to the "on" position. The electric motor 710 and solenoid 732 are energized, the pin 732 is retracted, the first 720 and second rocker arm 722 are disengaged from the disk 714, the support rails 750, 752 retract inwardly into the channels 740, 744, and the slide-out room 204 is retracted. At the fully retracted position, the motor/brake switch 712 is automatically set to the "off" position, the electric motor 710 and solenoid 730 are de-energized, the pin 732 is extended, the first 720 and second rocker arm 722 are engaged with the disk 714, and the slide-out room 204 is positively locked by the pawl brake 706.

The manual override system 704 may be used to retract or extend the slide-out room 204 when the electric motor 710 is inoperable. In order to extend the slide-out room 204, the pawl brake 706 is released by inserting the crank handle 776 into the lead-in tube 768. The crankshaft 760 is slidingly driven towards the link member 708, and the first end of the crankshaft 760 abuts the first contact surface 776 of the link member 708 and causes the link member 708 to pivot to the unlocking position. As the link member 708 pivots towards the unlocking position, the second contact surface 778 of the link member 708 engages the lever portion 780, 782 of each of the rocker arms 720, 722. The rocker arms 720, 722 pivot and disengage from the disk 714. With the pawl brake 706 released, the crank handle 772 is rotated until the slide-out room 204 is extended to the desired position. After the slide-out room 204 is extended to the desired position, the crank handle 772 is disengaged from the crankshaft 760, the bias member 784 pivots the link member 708 to the locking position, and the rocker arms 720, 722 pivot and engage with the disk 714. With the pawl brake 706 locked, the slide-out room 204 is prevented from retracting or extending. The slide-out room 204 may be retracted by inserting the crank handle 772 into the lead-in tube 768, wherein the crankshaft 760 is slidingly driven towards the link member 708. The first end of the crankshaft 760 abuts the first contact surface 776 of the link member 708 and causes the link member 708 to pivot to the unlocking position. As the link member 708 pivots towards the unlocking position, the second contact surface 778 of the link member 708 engages the lever portion 780, 782 of each of the rocker arms 720, 722. The rocker arms 720, 722 pivot and disengage from the disk 714. With the pawl brake 706 released, the crank handle 772 is rotated until the slide-out room 204 is retracted to the desired position. After the slide-out room 204 is retracted to the desired position, the crank handle 772 is disengaged from the crankshaft 760, the bias member 784 pivots the link member 708 to the locking position, and the rocker arms 720, 722 pivot and engage with the disk 714. With the pawl brake 706 locked, the slide-out room 204 is prevented from retracting or extending.

Although the present invention has been described in detail with regarding the exemplary embodiments and drawings thereof, it should be apparent to those skilled in the art that various adaptations may be accomplished without departing from the spirit and scope of the invention. For example, the present invention is suitable for use in vehicles other than trailers such as motor homes, motor coaches, or other towable vehicles. Furthermore, the present is not limited to slide-out mechanisms utilizing an electric motor and gear mechanism to extend and retract the slide-out room. The slide-out room may be automatically driven by a hydraulic, pneumatic, or any other system commonly known to one skilled in the art.

What is claimed is:

1. An apparatus for selectively extending and retracting a slide-out portion of a vehicle, comprising:
    a motor drivingly coupled to said slide-out portion through a gear box, said motor selectively extending and retracting said slide-out portion;
    a brake separate from said motor, said brake coupled to an output shaft of said gear box of said slide-out portion, said brake selectively releasing and locking said slide-out portion; and
    a manual override system coupled to said slide-out room, said manual override system comprising:
        a remote brake control system coupled to said brake, said remote brake control system releasing and locking said brake when said electric motor is inoperable.

2. The apparatus of claim 1, further comprising:
    a primary battery coupled to said motor and said brake, said primary battery providing power to said motor and said brake; and
    a backup battery coupled to said brake-only switch and said brake, said backup battery providing power to said brake in the event that said primary battery is unable to activate said brake in said release mode.

3. The apparatus of claim 2, wherein said backup battery is a standard 9-Volt battery.

4. An apparatus for selectively extending and retracting a slide-out portion of a vehicle, comprising:

a pair of first elongated members mounted to a fixed portion of said vehicle;

a pair of second elongated members mounted to said slide-out portion, said second elongated members telescopically coupled to said first elongated members;

a motor drivingly coupled to said pair of second elongated members;

a brake separate from said motor, said brake coupled to an output shaft of a gear box;

said motor and said brake and said gear box operating in combination to selectively extend, retract, and lock said pair of second elongated members; and a manual override system coupled to said pair of second elongated members, said manual override system selectively extending, retracting, and locking said slide-out portion in the event said motor is inoperable, said manual override system including a remote brake control system coupled to said brake, said remote brake control system remotely releasing and locking said brake when said electric motor is inoperable.

5. A method for selectively extending and retracting a slide-out portion of a vehicle, comprising:

securing a first pair of elongated members to a fixed portion of the vehicle;

securing a second pair of elongated members to the slide-out portion;

telescopically coupling the second pair of elongated members to the first pair of elongated members, wherein the slide-out portion extends and retracts relative to the fixed portion of the vehicle;

coupling a motor and a brake separate from said motor to the second pair of elongated members through a gear box, wherein the brake is coupled to an output shaft of the gear box and wherein the motor and the brake operate in combination to selectively extend, retract, and lock the slide-out portion;

manually extending and retracting the slide-out portion in the event that the motor is inoperable; and remotely releasing and locking the brake when the motor is inoperable.

6. The method of claim 5, wherein said remotely releasing and locking the brake when the motor is inoperable further comprises:

providing a brake-only switch in a readily accessible location; and releasing the brake by activating the brake-only switch; and locking the brake by deactivating the brake-only switch.

* * * * *